United States Patent
Ando et al.

(10) Patent No.: US 9,976,200 B2
(45) Date of Patent: May 22, 2018

(54) CLADDED ALUMINUM-ALLOY MATERIAL AND PRODUCTION METHOD THEREFOR, AND HEAT EXCHANGER USING SAID CLADDED ALUMINUM-ALLOY MATERIAL AND PRODUCTION METHOD THEREFOR

(71) Applicant: UACJ Corporation, Tokyo (JP)

(72) Inventors: Makoto Ando, Tokyo (JP); Yutaka Yanagawa, Tokyo (JP); Akio Niikura, Tokyo (JP)

(73) Assignee: UACJ Corporation, Tokyo (JP)

( * ) Notice: Subject to any disclaimer, the term of this patent is extended or adjusted under 35 U.S.C. 154(b) by 2 days.

(21) Appl. No.: 15/108,564

(22) PCT Filed: Dec. 17, 2014

(86) PCT No.: PCT/JP2014/006307
§ 371 (c)(1),
(2) Date: Jun. 27, 2016

(87) PCT Pub. No.: WO2015/104761
PCT Pub. Date: Jul. 16, 2015

(65) Prior Publication Data
US 2016/0319399 A1 Nov. 3, 2016

(30) Foreign Application Priority Data

Jan. 10, 2014 (JP) .................. 2014-003676

(51) Int. Cl.
*B23K 20/00* (2006.01)
*C22C 21/14* (2006.01)
(Continued)

(52) U.S. Cl.
CPC ................ *C22C 21/14* (2013.01); *B21B 1/22* (2013.01); *B21B 1/26* (2013.01); *B21B 3/00* (2013.01);
(Continued)

(58) Field of Classification Search
CPC ......... C22C 21/14; C22C 21/10; C22C 21/02; C22C 21/08; C22C 21/00; C22C 21/16;
(Continued)

(56) References Cited

U.S. PATENT DOCUMENTS 3,917,151 A * 11/1975 Robinson ............. B23K 35/002
228/217
4,146,163 A * 3/1979 Anderson ............. B23K 20/04
228/158

(Continued)

FOREIGN PATENT DOCUMENTS

EP 0712681 A2 * 5/1996 ........... B23K 1/0012
EP 1090745 A1 * 4/2001 ........... B32B 15/016
(Continued)

OTHER PUBLICATIONS

"International Search Report (Form PCT/ISA/210) of PCT/JP2014/006307", dated Apr. 7, 2015, with English translation thereof, pp. 1-6.

(Continued)

Primary Examiner — Kiley Stoner
(74) Attorney, Agent, or Firm — JCIPRNET

(57) ABSTRACT

A highly corrosion resistant and highly formable cladded aluminum-alloy material, a method for producing the same, a heat exchanger using the same and a method for producing the same are shown. The present cladded aluminum-alloy material has an aluminum alloy core material, an intermediate layer material clad on one surface of the core material and a brazing filler metal clad on the intermediate layer material surface which is not at the core material side, wherein a crystal grain size of the intermediate layer material before brazing heating is 60 μm or more, and in a cross section of the core material in a rolling direction before brazing heating, when R1 (μm) represents the crystal grain size in a plate thickness direction, and R2 (μm) represents (Continued)

the crystal grain size in the rolling direction, R1/R2 is 0.30 or less.

18 Claims, 1 Drawing Sheet

(51) Int. Cl.

| | |
|---|---|
| *B23K 1/00* | (2006.01) |
| *B23K 1/19* | (2006.01) |
| *B21B 1/22* | (2006.01) |
| *B21B 3/00* | (2006.01) |
| *B23K 35/28* | (2006.01) |
| *B23K 20/04* | (2006.01) |
| *B23K 31/02* | (2006.01) |
| *B23K 35/22* | (2006.01) |
| *C22C 21/00* | (2006.01) |
| *C22F 1/04* | (2006.01) |
| *C22C 21/02* | (2006.01) |
| *C22C 21/08* | (2006.01) |
| *C22C 21/10* | (2006.01) |
| *F28F 21/08* | (2006.01) |
| *B32B 15/01* | (2006.01) |
| *B21B 1/26* | (2006.01) |
| *B22D 7/00* | (2006.01) |
| *B23K 35/02* | (2006.01) |
| *C22F 1/043* | (2006.01) |
| *C22F 1/047* | (2006.01) |
| *C22F 1/053* | (2006.01) |
| *C22F 1/057* | (2006.01) |

(52) U.S. Cl.
CPC ............... *B22D 7/005* (2013.01); *B23K 1/00* (2013.01); *B23K 1/0012* (2013.01); *B23K 1/19* (2013.01); *B23K 20/04* (2013.01); *B23K 31/02* (2013.01); *B23K 35/0238* (2013.01); *B23K 35/22* (2013.01); *B23K 35/28* (2013.01); *B23K 35/288* (2013.01); *B32B 15/016* (2013.01); *C22C 21/00* (2013.01); *C22C 21/02* (2013.01); *C22C 21/08* (2013.01); *C22C 21/10* (2013.01); *C22F 1/04* (2013.01); *C22F 1/043* (2013.01); *C22F 1/047* (2013.01); *C22F 1/053* (2013.01); *C22F 1/057* (2013.01); *F28F 21/084* (2013.01); *F28F 21/089* (2013.01)

(58) Field of Classification Search
CPC .......... C22F 1/047; C22F 1/043; C22F 1/057; C22F 1/053; C22F 1/04; B23K 35/288; B23K 1/0012; B23K 35/0238; B23K 1/00; B23K 35/22; B23K 31/02; B23K 20/04; B23K 35/28; B23K 1/19; B23K 2201/14; B23K 2203/10; B23K 2203/20; B21B 1/26; B21B 3/00; B21B 1/22; B22D 7/005; B32B 15/016; F28F 21/089; F28F 21/084; B21D 53/04; C21D 2251/00
USPC .......................... 228/115–117, 183, 245–262, 228/262.5–262.51
See application file for complete search history.

(56) References Cited

U.S. PATENT DOCUMENTS

| | | | | |
|---|---|---|---|---|
| 4,146,164 A * | 3/1979 | Anderson | ............... | B23K 20/04 228/158 |
| 4,785,092 A * | 11/1988 | Nanba | ................... | B23K 35/286 228/262.51 |
| 5,476,725 A * | 12/1995 | Papich | ................. | B22D 11/008 148/523 |
| 6,316,126 B1 * | 11/2001 | Hasegawa | ............. | B32B 15/016 138/140 |
| 6,555,251 B2 * | 4/2003 | Kilmer | ................ | B23K 35/0238 138/142 |
| 6,605,370 B2 * | 8/2003 | Wittebrood | .............. | B23K 1/18 148/518 |
| 6,705,384 B2 * | 3/2004 | Kilmer | ................. | B22D 11/007 164/419 |
| 6,896,977 B2 * | 5/2005 | Nishimura | ......... | B23K 35/0238 165/177 |
| 7,000,823 B2 * | 2/2006 | Dockus | ................ | B23K 35/002 228/262.5 |
| 7,226,669 B2 * | 6/2007 | Benedictus | .......... | B23K 1/0012 148/523 |
| 7,255,932 B1 * | 8/2007 | Kilmer | ................. | B23K 35/002 165/905 |
| 7,374,827 B2 * | 5/2008 | Kilmer | ..................... | B23K 1/19 148/523 |
| 7,749,613 B2 * | 7/2010 | Koshigoe | .............. | B32B 15/016 165/905 |
| 8,043,711 B2 * | 10/2011 | Koshigoe | .............. | B32B 15/016 228/262.5 |
| 8,142,907 B2 * | 3/2012 | Fukumoto | .......... | B23K 35/0233 228/235.2 |
| 8,227,091 B2 * | 7/2012 | Ueda | .................. | B23K 35/0238 228/262.5 |
| 8,455,110 B2 * | 6/2013 | Wittebrood | .......... | B23K 35/002 228/262.51 |
| 8,663,817 B2 * | 3/2014 | Henry | ................ | B23K 35/0238 165/177 |
| 2002/0050511 A1 * | 5/2002 | Wittebrood | ........ | B23K 35/0238 228/247 |
| 2004/0035910 A1 * | 2/2004 | Dockus | ................ | B23K 35/002 228/56.3 |
| 2007/0246509 A1 * | 10/2007 | Koshigoe | .......... | B32B 15/016 228/101 |
| 2009/0324985 A1 * | 12/2009 | Tsuruno | ............ | B23K 35/0233 428/576 |
| 2010/0112370 A1 * | 5/2010 | Ueda | .................. | B23K 35/0238 428/576 |
| 2010/0151273 A1 * | 6/2010 | Wittebrood | .......... | B23K 35/002 428/650 |
| 2010/0159272 A1 * | 6/2010 | Marois | .................. | B32B 15/016 428/652 |
| 2010/0183897 A1 * | 7/2010 | Kobayashi | ......... | B23K 35/0238 428/654 |
| 2010/0304175 A1 * | 12/2010 | Kilmer | ............... | B23K 35/0233 428/576 |
| 2012/0177947 A1 * | 7/2012 | Abrahamsson | ...... | B23K 35/002 428/654 |
| 2014/0246483 A1 * | 9/2014 | Wittebrood | .......... | B23K 35/264 228/249 |
| 2014/0272463 A1 * | 9/2014 | Marois | ............... | B23K 35/0233 428/654 |
| 2014/0367454 A1 * | 12/2014 | Fujita | ..................... | B23K 20/04 228/158 |
| 2015/0118517 A1 * | 4/2015 | Itoh | ......................... | C22C 21/00 428/654 |
| 2015/0165564 A1 * | 6/2015 | Ahl | .......................... | B23K 1/012 428/654 |
| 2015/0203934 A1 * | 7/2015 | Oskarsson | ......... | B23K 35/0233 165/134.1 |
| 2016/0167177 A1 * | 6/2016 | Kamiya | ............... | B23K 35/288 148/502 |

FOREIGN PATENT DOCUMENTS

| | | | |
|---|---|---|---|
| EP | 2103702 | 9/2009 | |
| EP | 2248924 | 11/2010 | |
| EP | 2489750 A1 * | 8/2012 | ......... B23K 35/0238 |
| JP | H05-008087 | 1/1993 | |
| JP | H05-104281 | 4/1993 | |
| JP | H08-291354 | 11/1996 | |
| JP | H1053827 | 2/1998 | |

(56) References Cited

FOREIGN PATENT DOCUMENTS

| | | | |
|---|---|---|---|
| JP | H11-209837 | 8/1999 | |
| JP | 2000190089 A * | 7/2000 | ........... B32B 15/016 |
| JP | 2002059291 A * | 2/2002 | ........... B23K 1/0012 |
| JP | 3873267 B2 * | 1/2007 | ........... B32B 15/016 |
| JP | 2007-044713 | 2/2007 | |
| JP | 2007-190574 | 8/2007 | |
| JP | 2007-327094 | 12/2007 | |
| JP | 2008261026 | 10/2008 | |
| JP | 2010-255014 | 11/2010 | |
| JP | 2013-023748 | 2/2013 | |
| JP | 2013-234376 | 11/2013 | |
| JP | 5339560 B1 * | 11/2013 | ......... B23K 35/0238 |
| JP | 2014-077179 | 5/2014 | |
| JP | 2014-114475 | 6/2014 | |
| KR | 20070061410 A * | 6/2007 | ............. B23K 35/28 |
| KR | 20070061413 A * | 6/2007 | ........... B23K 35/286 |
| WO | WO 2011138085 A1 * | 11/2011 | ............... B32B 1/08 |

OTHER PUBLICATIONS

"Search Report of Europe Counterpart Application", dated Nov. 8, 2016, p. 1-p. 7, in which the listed references were cited.
"Office Action of China Counterpart Application", dated Apr. 25, 2017, with English translation thereof, p. 1-p. 16, in which the listed references were cited.

\* cited by examiner

CLADDED ALUMINUM-ALLOY MATERIAL AND PRODUCTION METHOD THEREFOR, AND HEAT EXCHANGER USING SAID CLADDED ALUMINUM-ALLOY MATERIAL AND PRODUCTION METHOD THEREFOR

CROSS-REFERENCE TO RELATED APPLICATION

This application is a 371 application of the international PCT application serial no. PCT/JP2014/006307, filed on Dec. 17, 2014, which claims the priority benefit of Japan application no. 2014-003676, filed on Jan. 10, 2014. The entirety of each of the abovementioned patent applications is hereby incorporated by reference herein and made a part of this specification.

TECHNICAL FIELD

The present invention relates to a highly corrosion resistant and highly formable cladded aluminum-alloy material and a production method thereof and specifically relates to a highly corrosion resistant and highly formable cladded aluminum-alloy material which is preferably used as a material constituting a path of a refrigerant or hot compressed air in a heat exchanger such as a radiator and a production method thereof. The invention further relates to a heat exchanger using the highly corrosion resistant and highly formable cladded aluminum-alloy material and in particular relates to a part forming a flow path of an automobile heat exchanger and the like.

BACKGROUND ART

Since aluminum alloys are light, have high thermal conductivity and can exhibit high corrosion resistance by appropriate treatment, aluminum alloys are used for automobile heat exchangers such as radiators, capacitors, evaporators, heaters or intercoolers. As a tube material of an automobile heat exchanger, a two-layer clad material having an Al—Mn-based aluminum alloy such as 3003 alloy as the core and a brazing filler metal of an Al—Si-based aluminum alloy or a sacrificial anode material of an Al—Zn-based aluminum alloy clad on a surface of the core or a three-layer clad material in which a brazing filler metal of an Al—Si-based aluminum alloy is further clad on the other surface of the core of such a two-layer clad material is used. A heat exchanger is generally produced by combining a tube material of such a clad material with a corrugated fin material and brazing the materials at a high temperature around 600° C.

In general, an aluminum alloy having a melting point of 600° C. or higher is used for a core material alloy of a brazing sheet, and an Al—Si-based alloy having a melting point of 600° C. or lower is used for a brazing filler metal alloy which is used for cladding. By producing a part of a heat exchanger using the brazing sheet, combining the part with other parts and heating the parts to a temperature around 600° C., only the brazing filler metal part of the brazing sheet is melted and brazed with the other parts, and a heat exchanger can be thus produced. When such a brazing sheet is used, many parts which constitute a heat exchanger can be brazed at the same time. Thus, a brazing sheet is widely used as a material of a heat exchanger.

Brazing methods which are actually used are mainly vacuum brazing method and Nocolok brazing method. For vacuum brazing method, a brazing filler metal containing an Al—Si—Mg-based alloy is used. When heated in a vacuum, Mg in the brazing filler metal is evaporated from the material and breaks the oxide layer on the surface of the material upon evaporation, and brazing becomes thus possible. However, a drawback of vacuum brazing method is that an expensive vacuum heating apparatus is required. For Nocolok brazing method, a brazing filler metal containing an Al—Si-based alloy is used. The material is coated with flux and then heated in an inert gas, and the oxide layer on the surface of the material is broken by the flux to enable brazing. However, because unevenness of coating of the flux causes a brazing failure, it is necessary to coat the necessary part with the flux evenly.

On the other hand, brazing methods which enable brazing by heating in an inert gas without using any expensive vacuum heating apparatus or flux have been proposed. PTL 1 describes a fluxless brazing method in which a product to be brazed containing Mg is coated with a carbonaceous cover and heated. In this method, Mg lowers the oxygen concentration in the carbonaceous cover and prevents the oxidation, and brazing becomes thus possible. Also, PTL 2 describes a fluxless brazing method in which a heat exchanger is composed using a clad material which contains a brazing filler metal and Mg. In this method, Mg in the brazing filler metal removes the oxide layer on the surface, and brazing becomes thus possible.

In addition, the tube shape is more complex in new heat exchangers used for recent automobiles in order to further improve the performance. Accordingly, it is now required that the materials have higher formability. The formability of a tube material has been adjusted by H14 refining type achieved by process annealing during cold rolling or by H24 refining type achieved by finish annealing after cold rolling. However, it has become difficult to satisfy the recent demand for high formability by refining alone.

In addition, when a corrosive liquid exists on the inner or outer surface of the tube of a heat exchanger, a hole may be made in the tube by pitting corrosion or the strength of pressure resistance may deteriorate because uniform corrosion reduces the tube thickness, resulting in the bursting of the tube. As a result, there is risk of the leakage of the air, coolant or refrigerant circulating inside. Moreover, when it is necessary to join a tube and a fin or to join a tube with itself for example, it is required that a brazing filler metal is provided on the surfaces. When the material is exposed to a severe corrosive environment due to snow melting salt or the like and a tube and a fin should be joined, for example in the case of the outer surface of the tube of a condenser, it has been attempted to balance the corrosion resistance and the brazing property by cladding the outer surface of the tube material with a layer having sacrificial anode effect as an intermediate layer and further cladding the outer surface with a brazing filler metal. However, as the tube shape has become complex as already described above, the corrosive liquid sometimes concentrates at a particular part, and simple cladding of an intermediate layer as in the conventional techniques is sometimes insufficient for preventing the leakage.

Techniques for improving the formability and the corrosion resistance separately have been proposed. For example, techniques for improving the formability or the electric resistance welding property of a clad material are shown in PTLs 3 and 4. However, the PTLs do not describe any means for improving the corrosion resistance of the sacrificial anode material. On the other hand, a technique for improving the corrosion resistance of a clad material is shown in PTL 5. However, the PTL does not describe any means for improving the formability of the clad material.

Specifically, regarding the clad material described in PTL 3, the electric resistance welding property of the material is improved by adjusting the mean grain size of the core material in a cross section at right angles to the longitudinal direction to 30 μm or less. With respect to the sacrificial anode material, it is defined that the area percentage of $Mg_2Si$ with a grain size of 0.2 μm or more is 0.5% or less, however, this is also means for improving the electric resistance welding property. Only the amounts of Zn and Mg are defined regarding the corrosion resistance of the sacrificial anode material, and a technique which would improve the corrosion resistance more than the conventional techniques is not described or suggested at all.

With respect to the clad material described in PTL 4, the electric resistance welding property of the material is improved by using a core material with a fibrous structure. Regarding the sacrificial anode material, it is defined that the hardness of the core material and the hardness of the sacrificial anode material are 50 Hv or more and that the ratio of hardness (sacrificial anode material/core material) is less than 1.0, however, this is means for securing the fatigue strength after braze heating. Only the amounts of Zn and Mn are defined regarding the corrosion resistance of the sacrificial anode material also in this document, and a technique which would improve the corrosion resistance more than the conventional techniques is not described or suggested at all.

On the other hand, regarding the clad material described in PTL 5, the corrosion resistance in an alkaline environment is improved by adjusting the grain size of the sacrificial anode material to 100 to 700 μm. However, only the components are defined regarding the core material, and the structure, the mechanical properties and the like thereof are not described. Also, PTL 3 does not describe or suggest the improvement of the formability at all.

Furthermore, the sacrificial anode materials described in the PTLs are all clad on the surface of a material, and it is not disclosed that the sacrificial anode materials are provided as intermediate layers between a core material and a brazing filler metal. In addition, all the brazing methods described in the PTLs are methods using flux, and a fluxless brazing method is not disclosed.

CITATION LIST

Patent Literature

PTL 1: JP-A-2007-044713
PTL 2: JP-A-2007-190574
PTL 3: JP-A-H8-291354
PTL 4: JP-A-2010-255014
PTL 5: JP-A-H11-209837

SUMMARY OF INVENTION

Technical Problem

The invention has been completed to solve the problems and aims to provide a cladded aluminum-alloy material which has excellent formability when used for example as a tube material of a heat exchanger and excellent corrosion resistance after braze heating due to the intermediate layer material and which enables fluxless brazing and a production method thereof and to provide a heat exchanger using the cladded aluminum-alloy material and a production method thereof. Such a highly corrosion resistant cladded aluminum-alloy material can be preferably used as a part forming a flow path of an automobile heat exchanger.

Solution to Problem

The present inventors have conducted intensive studies on the problems, and as a result, the inventors have found that the problems can be solved by using a clad material composed of a core material and an intermediate layer material which have specific alloy compositions and metal structures for the clad material and thus completed the invention.

That is, in claim 1, the first embodiment of the invention is a cladded aluminum-alloy material having an aluminum alloy core material, an intermediate layer material clad on one surface of the core material and a brazing filler metal clad on the intermediate layer material surface which is not at the core material side wherein the core material comprises an aluminum alloy comprising 0.05 to 1.50 mass % Si, 0.05 to 2.00 mass % Fe, 0.5 to 2.0 mass % Mn and a balance of Al and unavoidable impurities, either one or both of the intermediate layer material and the brazing filler metal comprises 0.05 to 2.50 mass % Mg, the intermediate layer material comprises an aluminum alloy further comprising 0.5 to 8.0 mass % Zn, 0.05 to 1.50 mass % Si, 0.05 to 2.00 mass % Fe and a balance of Al and unavoidable impurities, and the brazing filler metal comprises an aluminum alloy further comprising 2.5 to 13.0 mass % Si, 0.05 to 1.20 mass % Fe and a balance of Al and unavoidable impurities, a crystal grain size of the intermediate layer material before brazing heating is 60 μm or more, and in a cross section of the core material in a rolling direction before brazing heating, when R1 (μm) represents the crystal grain size in a plate thickness direction, and R2 (μm) represents the crystal grain size in the rolling direction, R1/R2 is 0.30 or less.

In claim 2 of the invention, the core material comprises the aluminum alloy further comprising one or, two or more selected from 0.05 to 3.50 mass % Mg, 0.05 to 1.50 mass % Cu, 0.05 to 0.30 mass % Ti, 0.05 to 0.30 mass % Zr, 0.05 to 0.30 mass % Cr and 0.05 to 0.30 mass % V in claim 1.

In claim 3 of the invention, the intermediate layer material comprises the aluminum alloy further comprising one or, two or more selected from 0.05 to 2.00 mass % Ni, 0.05 to 2.00 mass % Mn, 0.05 to 0.30 mass % Ti, 0.05 to 0.30 mass % Zr, 0.05 to 0.30 mass % Cr and 0.05 to 0.30 mass % V in claim 1 or 2.

In claim 4 of the invention, the brazing filler metal comprises the aluminum alloy further comprising one or, two or more selected from 0.5 to 8.0 mass % Zn, 0.05 to 1.50 mass % Cu, 0.05 to 2.00 mass % Mn, 0.05 to 0.30 mass % Ti, 0.05 to 0.30 mass % Zr, 0.05 to 0.30 mass % Cr and 0.05 to 0.30 mass % V in any one of claims 1 to 3.

In claim 5 of the invention, the brazing filler metal comprises the aluminum alloy further comprising one or two selected from 0.001 to 0.050 mass % Na and 0.001 to 0.050 mass % Sr in any one of claims 1 to 4.

In claim 6 of the invention, a method for producing the cladded aluminum-alloy material according to any one of claims 1 to 5, comprising: a step of casting the aluminum alloys for the core material, the intermediate layer material and the brazing filler metal, respectively, a hot rolling step of hot rolling the cast intermediate layer material ingot and the cast brazing filler metal ingot to predetermined thicknesses, respectively, a cladding step of cladding the intermediate layer material rolled to the predetermined thickness on one surface of the core material ingot, and cladding the brazing filler metal rolled to the predetermined thickness on the intermediate layer material surface which is not at the core material side and thus obtaining a clad material, a hot clad rolling step of hot rolling the clad material, a cold rolling step of cold rolling the hot-clad-rolled clad material, and one or more annealing steps of annealing the clad material either during or after the cold rolling step or both during and after the cold rolling step, wherein in the hot clad rolling step, the rolling start temperature is 400 to 520° C., and the number of rolling passes each with a rolling reduction of 30% or more is restricted to five or less while the temperature of the clad material is 200 to 400° C., and the clad material is held at 200 to 560° C. for 1 to 10 hours in the annealing steps.

In claim 7, the second embodiment of the invention is a cladded aluminum-alloy material having an aluminum alloy core material, an intermediate layer material clad on one surface of the core material, a brazing filler metal clad on the intermediate layer material surface which is not at the core material side, and a brazing filler metal clad on the other surface of the core material, wherein the core material comprises an aluminum alloy comprising 0.05 to 1.50 mass % Si, 0.05 to 2.00 mass % Fe, 0.5 to 2.0 mass % Mn and a balance of Al and unavoidable impurities, either one or both of the intermediate layer material and the brazing filler metal clad on the intermediate layer material surface which is not at the core material side comprises 0.05 to 2.50 mass % Mg, the intermediate layer material comprises an aluminum alloy further comprising 0.5 to 8.0 mass % Zn, 0.05 to 1.50 mass % Si, 0.05 to 2.00 mass % Fe and a balance of Al and unavoidable impurities, the brazing filler metal clad on the intermediate layer material surface which is not at the core material side comprises an aluminum alloy further comprising 2.5 to 13.0 mass % Si, 0.05 to 1.20 mass % Fe and a balance of Al and unavoidable impurities, the brazing filler metal clad on the other surface of the core material comprises an aluminum alloy comprising 2.5 to 13.0 mass % Si, 0.05 to 1.20 mass % Fe, 0.05 to 2.50 mass % Mg and a balance of Al and unavoidable impurities, a crystal grain size of the intermediate layer material before brazing heating is 60 μm or more, and in a cross section of the core material in a rolling direction before brazing heating, when R1 (μm) represents the crystal grain size in a plate thickness direction, and R2 (μm) represents the crystal grain size in the rolling direction, R1/R2 is 0.30 or less.

In claim 8 of the invention, the core material comprises the aluminum alloy further comprising one or, two or more selected from 0.05 to 3.50 mass % Mg, 0.05 to 1.50 mass % Cu, 0.05 to 0.30 mass % Ti, 0.05 to 0.30 mass % Zr, 0.05 to 0.30 mass % Cr and 0.05 to 0.30 mass % V in claim 7.

In claim 9 of the invention, the intermediate layer material comprises the aluminum alloy further comprising one or, two or more selected from 0.05 to 2.00 mass % Ni, 0.05 to 2.00 mass % Mn, 0.05 to 0.30 mass % Ti, 0.05 to 0.30 mass % Zr, 0.05 to 0.30 mass % Cr and 0.05 to 0.30 mass % V in claim 7 or 8.

In claim 10 of the invention, the brazing filler metal clad on the intermediate layer material surface which is not at the core material side comprises the aluminum alloy further comprising one or, two or more selected from 0.5 to 8.0 mass % Zn, 0.05 to 1.50 mass % Cu, 0.05 to 2.00 mass % Mn, 0.05 to 0.30 mass % Ti, 0.05 to 0.30 mass % Zr, 0.05 to 0.30 mass % Cr and 0.05 to 0.30 mass % V in any one of claims 7 to 9.

In claim 11 of the invention, the brazing filler metal clad on the intermediate layer material surface which is not at the core material side comprises the aluminum alloy further comprising one or two selected from 0.001 to 0.050 mass % Na and 0.001 to 0.050 mass % Sr in any one of claims 7 to 10.

In claim 12 of the invention, the brazing filler metal clad on the other surface of the core material comprises the aluminum alloy further comprising one or, two or more selected from 0.5 to 8.0 mass % Zn, 0.05 to 1.50 mass % Cu, 0.05 to 2.00 mass % Mn, 0.05 to 0.30 mass % Ti, 0.05 to 0.30 mass % Zr, 0.05 to 0.30 mass % Cr and 0.05 to 0.30 mass % V in any one of claims 7 to 11.

In claim 13 of the invention, the brazing filler metal clad on the other surface of the core material comprises the aluminum alloy further comprising one or two selected from 0.001 to 0.050 mass % Na and 0.001 to 0.050 mass % Sr in any one of claims 7 to 12.

In claim 14 of the invention, a method for producing the cladded aluminum-alloy material according to any one of claims 7 to 13, comprising: a step of casting the aluminum alloys for the core material, the intermediate layer material, the brazing filler metal clad on the intermediate layer material surface which is not at the core material side and the brazing filler metal clad on the other surface of the core material, respectively, a hot rolling step of hot rolling the cast intermediate layer material ingot, the cast brazing filler metal ingot clad on the intermediate layer material surface which is not at the core material side and the cast brazing filler metal ingot clad on the other surface of the core material to predetermined thicknesses, respectively, a cladding step of cladding the intermediate layer material rolled to the predetermined thickness on one surface of the core material ingot, cladding the brazing filler metal rolled to the predetermined thickness on the intermediate layer material surface which is not at the core material side, and cladding the brazing filler metal rolled to the predetermined thickness on the other surface of the core material ingot and thus obtaining a clad material, a hot clad rolling step of hot rolling the clad material, a cold rolling step of cold rolling the hot-clad-rolled clad material, and one or more annealing steps of annealing the clad material either during or after the cold rolling step or both during and after the cold rolling step, wherein in the hot clad rolling step, the rolling start temperature is 400 to 520° C., and the number of rolling passes each with a rolling reduction of 30% or more is restricted to five or less while the temperature of the clad material is 200 to 400° C., and the clad material is held at 200 to 560° C. for 1 to 10 hours in the annealing steps.

In claim 15 of the invention, a heat exchanger using the cladded aluminum-alloy material according to any one of claims 1 to 5 and 7 to 13, wherein the crystal grain size of the intermediate layer material after brazing heating is 100 μm or more.

In claim 16 of the invention, a method for producing the heat exchanger according to claim 15, wherein an aluminum alloy material is brazed in an inert gas atmosphere without flux.

The cladded aluminum-alloy material according to the invention can be formed excellently even into a complex tube shape when the cladded aluminum-alloy material is used as a tube material of a heat exchanger for example, and the cladded aluminum-alloy material exhibits excellent corrosion resistance after braze heating due to the intermediate layer material. Also, when the cladded aluminum-alloy material according to the invention is used, fluxless brazing is possible. A heat exchanger of an automobile or the like is provided using such a cladded aluminum-alloy material as a part forming a flow path or the like. The clad material also has excellent brazing properties such as erosion resistance and is preferably used as a tube material of an automobile heat exchanger further in view of the lightness and the excellent thermal conductivity.

Figure 1:
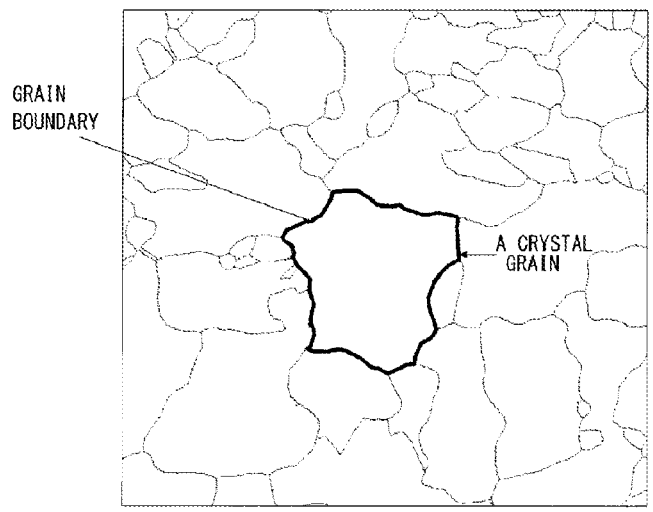
FIG. 1

A schematic figure illustrating a crystal grain surrounded by grain boundaries in a rolled surface of an intermediate layer material.

FIG. 2

A schematic figure illustrating a crystal grain size R1 in the thickness direction and a crystal grain size R2 in the rolling direction in a cross section of a core material along the rolling direction.

FIG. 3

A polarized light microscopic image of a cross section along the rolling direction where a core material having a fibrous structure was subjected to anodic oxidation.

DESCRIPTION OF EMBODIMENTS

Preferable embodiments of the cladded aluminum-alloy material exhibiting high corrosion resistance and high formability according to the invention, the production method thereof, the heat exchanger using the cladded aluminum-alloy material and the production method thereof are explained in detail.

1. Layers Constituting Cladded Aluminum-Alloy Material

The cladded aluminum-alloy material according to the invention has excellent formability because the components and the metal structure of the core material are controlled properly, and the cladded aluminum-alloy material has excellent corrosion resistance because the components and the metal structure of the intermediate layer material, which is clad on a surface of the core material, are controlled properly. Furthermore, the cladded aluminum-alloy material enables fluxless brazing because the components of the intermediate layer material and the brazing filler metal are controlled properly. Accordingly, regarding the cladded aluminum-alloy material according to the first embodiment of the invention, cladding on the other surface of the core material is not particularly restricted. For example, when the tube is produced by a process such as welding and it is not necessary to braze the tube and a fin, the other surface of the core material may be without cladding in the cladded aluminum-alloy material according to the first embodiment of the invention. On the other hand, when the tube material is joined to itself by brazing or when the tube and a fin are brazed, the other surface of the core material is also clad with the brazing filler metal in the cladded aluminum-alloy material according to the second embodiment of the invention.

The components of the core material, the intermediate layer material and the two brazing filler metals, namely the brazing filler metal which is clad on the intermediate layer material surface which is not at the core material side (referred to as "a first brazing filler metal" below) and the brazing filler metal which is clad on the other surface of the core material (referred to as "a second brazing filler metal" below) are explained below.

2. Addition of Mg to Intermediate Layer Material and Brazing Filler Metals

For brazing using the cladded aluminum-alloy material according to the invention, a method of braze heating in an inert gas without using any flux is preferably employed. In this brazing method, brazing with the material to be joined is possible, since Mg reduces and breaks the oxide layer on the brazing filler metal surface and the metal surface of the melted brazing filler metal is exposed. The Mg on the brazing filler metal surface is added to either one or both of the first brazing filler metal and the intermediate layer material in the first embodiment. In the second embodiment, the Mg is added to either one or both of the first brazing filler metal and the intermediate layer material and also to the second brazing filler metal. When Mg is added to the first brazing filler metal, Mg is supplied to the brazing filler metal surface through the diffusion of Mg in the first brazing filler metal to the brazing filler metal surface during braze heating. When Mg is added to the intermediate layer material, Mg is supplied to the brazing filler metal surface through the diffusion of Mg from the intermediate layer material to the first brazing filler metal surface during braze heating. When Mg is added to both of the first brazing filler metal and the intermediate layer material, Mg is supplied to the brazing filler metal surface through the diffusion of the both types. Moreover, Mg added to the second brazing filler metal also diffuses to the second brazing filler metal surface during braze heating and thus is supplied to the brazing filler metal surface.

The amount of Mg added to the first and second brazing filler metals and the intermediate layer material is 0.05 to 2.50 mass % (simply indicated by "%" below). When the amount is less than 0.05%, brazing hardly functions since the amount of Mg supplied to the brazing filler metal surface is low and the effect of reducing the oxide layer is not sufficient. On the other hand, when the amount exceeds 2.50%, the Mg amount in the melted brazing filler metal becomes excessive due to the concentration of Mg, and oxide of Mg tends to be formed and adversely affects the brazing property. The Mg content is preferably 0.05 to 2.00%. When the first brazing filler metal does not contain Mg, the Mg content of the intermediate layer material is preferably 1.00 to 2.50% and further preferably 1.00 to 2.00%.

3. Core Material

An aluminum alloy comprising 0.05 to 1.50% Si, 0.05 to 2.00% Fe and 0.5 to 2.0% Mn as essential elements and a balance of Al and unavoidable impurities is used for the core material in the first embodiment and the second embodiment.

An aluminum alloy which further comprises one or, two or more selected from 0.05 to 3.50% Mg, 0.05 to 1.50% Cu, 0.05 to 0.30% Ti, 0.05 to 0.30% Zr, 0.05 to 0.30% Cr and 0.05 to 0.30% V as optional additional elements in addition to the essential elements may be used for the core material in the both of above embodiments.

Furthermore, besides the essential elements and the optional additional elements, unavoidable impurities may be comprised each in an amount of 0.05% or less and in a total amount of 0.15% for the core material in the both of above embodiments.

As the aluminum alloy used for the core material of the both of above embodiments, Al—Mn-based alloys such as JIS 3000 series alloys including JIS 3003 alloy and the like for example are preferably used. While each component is explained below, each of said ingredients is common to the first and second embodiments.

Si:

Si forms an Al—Fe—Mn—Si-based intermetallic compound with Fe and Mn and improves the strength of the core material through dispersion strengthening or improves the strength of the core material through solid solution strengthening by diffusing into the aluminum parent phase to form a solid solution. The Si content is 0.05 to 1.50%. For a content less than 0.05%, use of high purity aluminum metal is required, resulting in high cost. On the other hand, when the content exceeds 1.50%, the melting point of the core material decreases, and the core material is more likely to melt during brazing. A preferable Si content is 0.10 to 1.20%.

Fe:

Fe forms an Al—Fe—Mn—Si-based intermetallic compound with Si and Mn and improves the strength of the core material through dispersion strengthening. The Fe content is 0.05 to 2.00%. For a content less than 0.05%, use of high purity aluminum metal is required, resulting in high cost. On the other hand, when the content exceeds 2.00%, a giant intermetallic compound tends to be formed during casting, and the plasticity deteriorates. A preferable Fe content is 0.10 to 1.50%.

Mn:

Mn forms an Al—Mn—Si-based or Al—Fe—Mn—Si-based intermetallic compound with Si and improves the strength of the core material through dispersion strengthening or improves the strength of the core material through solid solution strengthening by diffusing into the aluminum parent phase to form a solid solution. The Mn content is 0.5 to 2.0%. When the content is less than 0.5%, the effects are insufficient, while when the content exceeds 2.0%, a giant intermetallic compound tends to be formed during casting, and the plasticity deteriorates. A preferable Mn content is 0.8 to 1.8%.

Cu:

Cu may be comprised because Cu improves the strength of the core material through solid solution strengthening. The Cu content is 0.05 to 1.50%. When the content is less than 0.05%, the effect is insufficient, while when the content exceeds 1.50%, the aluminum alloy is more likely to crack during casting. A preferable Cu content is 0.30 to 1.00%.

Mg:

Mg may be comprised because precipitation of $Mg_2Si$ improves the strength of the core material. The Mg content is 0.05 to 3.50%. When the content is less than 0.05%, the effect is insufficient, while when the content exceeds 3.50%, a melting point of the core material becomes lower and thus it is highly possible for the core material to melt. A preferable Mg content is 0.10 to 3.00%.

Ti:

Ti may be comprised because Ti improves the strength of the core material through solid solution strengthening. The Ti content is 0.05 to 0.30%. When the content is less than 0.05%, the effect is insufficient. When the content exceeds 0.30%, a giant intermetallic compound tends to be formed, and the plasticity deteriorates. A preferable Ti content is 0.10 to 0.20%.

Zr:

Zr may be comprised because Zr has effects of improving the strength of the core material through solid solution strengthening and coarsening the crystal grains after braze heating by precipitation of an Al—Zr-based intermetallic compound. The Zr content is 0.05 to 0.30%. When the content is less than 0.05%, the effects cannot be obtained. On the other hand, when the content exceeds 0.30%, a giant intermetallic compound tends to be formed, and the plasticity deteriorates. A preferable Zr content is 0.10 to 0.20%.

Cr:

Cr may be comprised because Cr has effects of improving the strength of the core material through solid solution strengthening and coarsening the crystal grains after braze heating by precipitation of an Al—Cr-based intermetallic compound. The Cr content is 0.05 to 0.30%. When the content is less than 0.05%, the effects cannot be obtained. On the other hand, when the content exceeds 0.30%, a giant intermetallic compound tends to be formed, and the plasticity deteriorates. A preferable Cr content is 0.10 to 0.20%.

V:

V may be comprised because V improves the strength of the core material through solid solution strengthening and also improves the corrosion resistance. The V content is 0.05 to 0.30%. When the content is less than 0.05%, the effects cannot be obtained. On the other hand, when the content exceeds 0.30%, a giant intermetallic compound tends to be formed, and the plasticity deteriorates. A preferable V content is 0.10 to 0.20%.

At least one of the elements Mg, Cu, Ti, Zr, Cr and V may be added to the core material when needed.

4. Intermediate Layer Material

An aluminum alloy containing 0.5 to 8.0% Zn, 0.05 to 1.50% Si and 0.05 to 2.00% Fe as essential elements and a balance of Al and unavoidable impurities is used for the intermediate layer material in the first and second embodiments.

Moreover, as already described above, although the intermediate layer material may contain 0.05 to 2.50% Mg, the intermediate layer material does not have to contain Mg when the first brazing filler metal contains Mg. When the first brazing filler metal does not contain Mg, the intermediate layer contains Mg. In this case, the Mg content of the intermediate layer is preferably 1.00 to 2.50% and further preferably 1.00 to 2.00%.

An aluminum alloy which further contains one or, two or more selected from 0.05 to 2.00% Ni, 0.05 to 2.00% Mn, 0.05 to 0.30% Ti, 0.05 to 0.30% Zr, 0.05 to 0.30% Cr and 0.05 to 0.30% V as optional additional elements may be used for the intermediate layer material in the both of embodiments above in addition to the essential elements and Mg. Furthermore, besides the essential elements and the optional additional elements, unavoidable impurities may be contained each in an amount of 0.05% or less and in a total amount of 0.15% in the both of embodiments above. While each component is explained below, each of said ingredients is common to the first and second embodiments.

Zn:

Zn can shift the pitting potential in the less noble direction and can improve the corrosion resistance through sacrificial anticorrosion effect by generating a potential difference from the core material. The Zn content is 0.5 to 8.0%. When the content is less than 0.5%, the effect of improving the corrosion resistance through the sacrificial anticorrosion effect cannot be obtained sufficiently. On the other hand, when the content exceeds 8.0%, the corrosion rate increases, and the intermediate layer material is lost at an early stage, resulting in the deterioration of the corrosion resistance. A preferable Zn content is 1.0 to 6.0%.

Si:

Si forms an Al—Fe—Si based intermetallic compound with Fe and forms an Al—Fe—Mn—Si based intermetallic compound with Fe and Mn when Mn is comprised at the same time. Si thus improves the strength of the intermediate layer material through dispersion strengthening or improves the strength of the intermediate layer material through solid solution strengthening by diffusing into the aluminum parent phase to form a solid solution. Moreover, since Si shifts the potential of the intermediate layer material in the more noble direction, Si inhibits the sacrificial anticorrosion effect and deteriorates the corrosion resistance. The Si content is 0.05 to 1.50%. For a content less than 0.05%, use of high purity aluminum metal is required, resulting in high cost. On the other hand, when the content exceeds 1.50%, the pitting potential of the intermediate layer material is shifted in the more noble direction, and the sacrificial anticorrosion effect is lost, resulting in the deterioration of the corrosion resistance. A preferable Si content is 0.10 to 1.20%.

Fe:

Fe forms an Al—Fe—Si-based intermetallic compound with Si and forms an Al—Fe—Mn—Si-based intermetallic compound with Si and Mn when Mn is contained at the same time. Fe thus improves the strength of the intermediate layer material through dispersion strengthening. The amount of Fe is 0.05 to 2.00%. For a content less than 0.05%, use of high purity aluminum metal is required, resulting in high cost. On the other hand, when the content exceeds 2.00%, a giant intermetallic compound tends to be formed during casting, and the plasticity deteriorates. A preferable Fe content is 0.10 to 1.50% or less.

Ni:

Ni forms an Al—Ni-based intermetallic compound or an Al—Fe—Ni-based intermetallic compound with Fe. The intermetallic compounds have significantly noble corrosion potential as compared to the aluminum matrix and thus act as cathode sites of corrosion. Accordingly, when the intermetallic compounds are dispersed in the intermediate layer material, the sites for the onset of corrosion are dispersed. As a result, the corrosion in the depth direction is unlikely to progress, resulting in the improvement of the corrosion resistance, thus Ni may be comprised. Further, Ni has an effect to improve the strength of the intermediate layer material. So, the Ni content is 0.05 to 2.00% to improve the corrosion resistance and the strength. When the content is less than 0.05%, the effects to improve the corrosion resistance and strength cannot be obtained sufficiently. On the other hand, when the content exceeds 2.00%, a giant intermetallic compound tends to be formed during casting, and the plasticity deteriorates. A preferable Ni content is 0.10 to 1.50%.

Mn:

Mn may be comprised because Mn improves the strength and the corrosion resistance of the intermediate layer material. The Mn content is 0.05 to 2.00%. When the content exceeds 2.00%, a giant intermetallic compound tends to be formed during casting, and the plasticity deteriorates. On the other hand, when the content is less than 0.05%, the effects cannot be obtained sufficiently. A preferable Mn content is 0.05 to 1.80%.

Ti:

Ti may be comprised because Ti improves the strength of the intermediate layer material through solid solution strengthening and also improves the corrosion resistance. The Ti content is 0.05 to 0.30%. When the content is less than 0.05%, the effects cannot be obtained. When the content exceeds 0.30%, a giant intermetallic compound tends to be formed, and the plasticity deteriorates. A preferable Ti content is 0.05 to 0.20%.

Zr:

Zr may be comprised because Zr has effects of improving the strength of the intermediate layer material through solid solution strengthening and coarsening the crystal grains after braze heating by precipitation of an Al—Zr-based intermetallic compound. The Zr content is 0.05 to 0.30%. When the content is less than 0.05%, the effects cannot be obtained. On the other hand, when the content exceeds 0.30%, a giant intermetallic compound tends to be formed, and the plasticity deteriorates. A preferable Zr content is 0.10 to 0.20%.

Cr

Cr may be comprised because Cr has effects of improving the strength of the intermediate layer material through solid solution strengthening and coarsening the crystal grains after braze heating by precipitation of an Al—Cr-based intermetallic compound. The Cr content is 0.05 to 0.30%. When the content is less than 0.05%, the effects cannot be obtained. When the content exceeds 0.30%, a giant intermetallic compound tends to be formed, and the plasticity deteriorates. A preferable Cr content is 0.10 to 0.20%.

V:

V may be comprised because V improves the strength of the intermediate layer material through solid solution strengthening and also improves the corrosion resistance. The V content is 0.05 to 0.30%. When the content is less than 0.05%, the effects cannot be obtained. When the content exceeds 0.30%, a giant intermetallic compound tends to be formed, and the plasticity deteriorates. A preferable V content is 0.05 to 0.20%.

At least one of the elements Ni, Mn, Ti, Zr, Cr and V may be added to the intermediate layer material when needed.

5. Brazing Filler Metal

For the first brazing filler metal in the first and second embodiments, an aluminum alloy containing 2.5 to 13.0% Si and 0.05 to 1.20% Fe as essential elements and a balance of Al and unavoidable impurities is used. As already described above, although the first brazing filler metal may contain 0.05 to 2.50% Mg, the first brazing filler metal does not have to contain Mg when the intermediate layer material contains Mg.

For the second brazing filler metal in the second embodiment, an aluminum alloy containing 2.5 to 13.0% Si, 0.05 to 1.20% Fe and 0.05 to 2.50% Mg as essential elements and a balance of Al and unavoidable impurities is used.

The first brazing filler metal for the both of the embodiments above in addition to the essential elements (when containing Mg, "the essential elements and Mg", the same shall apply hereinafter) and the second brazing filler metal for the second embodiments in addition to the essential elements, may contain one or, two or more selected from 0.5 to 8.0% Zn, 0.05 to 1.50% Cu, 0.05 to 2.00% Mn, 0.05 to 0.30% Ti, 0.05 to 0.30% Zr, 0.05 to 0.30% Cr and 0.05 to 0.30% V. Moreover, for the both of the embodiments above, one or two selected from 0.001 to 0.050 mass % Na and 0.001 to 0.050 mass % Sr may be contained as a second optional additional elements in addition to the essential elements or to the essential elements and the first optional additional elements, Furthermore, besides the essential elements and the first and/or the second optional additional elements, unavoidable impurities may be contained each in an amount of 0.05% or less and in a total amount of 0.15%. While each component is explained below, each of said ingredients is common to the first and second embodiments.

Si:

The containing of Si decreases the melting point of the brazing filler metal and generates a liquid phase, and thus brazing becomes possible. The Si content is 2.5 to 13.0%. When the content is less than 2.5%, only a small amount of liquid phase is generated, and brazing is unlikely to function. On the other hand, when the content exceeds 13.0%, the amount of Si which diffuses into the material to be brazed such as a fin becomes excessive in the case where the brazing filler metal is used for a tube material for example, and the material to be brazed melts. A preferable Si content is 3.5 to 12.0%.

Fe:

Since Fe tends to form an Al—Fe-based or Al—Fe—Si-based intermetallic compound, Fe decreases the effective Si amount for brazing and deteriorates the brazing property. The Fe content is 0.05 to 1.20%. For a content less than 0.05%, use of high purity aluminum metal is required, resulting in high cost. On the other hand, when the content exceeds 1.20%, the effective Si amount for brazing decreases, and brazing becomes insufficient. A preferable Fe content is 0.10 to 0.50%.

Zn:

Zn may be comprised because Zn can shift the pitting potential in the less noble direction and can improve the corrosion resistance through sacrificial anticorrosion effect by generating a potential difference from the core material. The Zn content is 0.5 to 8.0%. When the content is less than 0.5%, the effect of improving the corrosion resistance through the sacrificial anticorrosion effect cannot be obtained sufficiently. On the other hand, when the content exceeds 8.0%, the corrosion rate increases, and the sacrificial anticorrosion layer is lost at an early stage, resulting in the deterioration of the corrosion resistance. A preferable Zn content is 1.0 to 6.0%.

Cu:

Cu may be comprised because Cu improves the strength of the brazing filler metal through solid solution strengthening. The Cu content is 0.05 to 1.50%. When the content is less than 0.05%, the effect is insufficient, while when the content exceeds 1.50%, the aluminum alloy is more likely to crack during casting. A preferable Cu content is 0.30 to 1.00%.

Mn:

Mn may be comprised because Mn improves the strength of the brazing filler metal and the corrosion resistance. The Mn content is 0.05 to 2.00%. When the content exceeds 2.00%, a giant intermetallic compound tends to be formed during casting, and the plasticity deteriorates. On the other hand, when the content is less than 0.05%, the effects cannot be obtained sufficiently. A preferable Mn content is 0.05 to 1.80%.

Ti:

Ti may be comprised because Ti improves the strength of the brazing filler metal through solid solution strengthening and also improves the corrosion resistance. The Ti content is 0.05 to 0.30%. When the content is less than 0.05%, the effects cannot be obtained. When the content exceeds 0.30%, a giant intermetallic compound tends to be formed, and the plasticity deteriorates. A preferable Ti content is 0.10 to 0.20%.

Zr:

Zr may be comprised because Zr has effects of improving the strength of the brazing filler metal through solid solution strengthening and coarsening the crystal grains after braze heating by precipitation of an Al—Zr-based intermetallic compound. The Zr content is 0.05 to 0.30%. When the content is less than 0.05%, the effects cannot be obtained. When the content exceeds 0.30%, a giant intermetallic compound tends to be formed, and the plasticity deteriorates. A preferable Zr content is 0.10 to 0.20%.

Cr:

Cr may be comprised because Cr has effects of improving the strength of the brazing filler metal through solid solution strengthening and coarsening the crystal grains after braze heating by precipitation of an Al—Cr-based intermetallic compound. The Cr content is 0.05 to 0.30%. When the content is less than 0.05%, the effects cannot be obtained. When the content exceeds 0.30%, a giant intermetallic compound tends to be formed, and the plasticity deteriorates. A preferable Cr content is 0.10 to 0.20%.

V:

V may be comprised because V improves the strength of the brazing filler metal through solid solution strengthening and also improves the corrosion resistance. The V content is 0.05 to 0.30%. When the content is less than 0.05%, the effects cannot be obtained. When the content exceeds 0.30%, a giant intermetallic compound tends to be formed, and the plasticity deteriorates. A preferable V content is 0.10 to 0.20%.

Na and Sr:

Na and Sr exhibit an effect of making the Si grains in the brazing filler metal fine. The Na and Sr contents are 0.001 to 0.050%. When the contents are less than 0.001%, the effect cannot be obtained sufficiently. On the other hand, when the contents exceed 0.050%, the oxide layer becomes thick, and the brazing property deteriorates. The contents are preferably 0.003 to 0.020%.

At least one of the elements Zn, Cu, Mn, Ti, Zr, Cr, V, Na and Sr may be added to the brazing filler metal when needed.

6. Crystal Grain Size of Intermediate Layer Material

In the cladded aluminum-alloy material of the invention, the crystal grain size of the intermediate layer material before brazing heating is prescribed to 60 μm or more and the crystal grain size of the intermediate layer material after brazing heating is prescribed to 100 μm or more. This aims at improving the corrosion resistance of the intermediate layer material after brazing heating. As shown in FIG. 1, the crystal grain size here means the equivalent circle diameter of a crystal grain, where the crystal grain is an area surrounded by grain boundaries when the rolled surface of the intermediate layer material is observed. A grain boundary is a boundary with a difference between the neighboring crystal orientations of 20 degrees or more. The method for measuring the crystal grain size is not particularly restricted, but electron backscatter diffraction (EBSD) is generally used. The reasons for the restriction are explained below.

The intermediate layer material is clad for the purpose of sacrificial anticorrosion in which corrosion perforation of a tube is prevented by the corrosion being made to spread on the plane. When the corrosion rate of the intermediate layer material is high, however, the intermediate layer material is lost at an early stage, and the sacrificial anticorrosion effect is lost, leading to corrosion perforation of the tube.

As a result of intensive studies, the inventors have found that the corrosion rate at the crystal grain boundaries in the intermediate layer material is higher than that in the crystal grains and that the corrosion rate can be restricted by decreasing the area of the crystal grain boundaries. To decrease the area of the crystal grain boundaries means to increase the crystal grain size. Upon investigation in further detail, it has been found that the corrosion rate of the intermediate layer material is restricted and the cladded aluminum-alloy material has excellent corrosion resistance when the crystal grain size of the intermediate layer material is 100 μm or more after brazing heating. When the crystal grain size of the intermediate layer material is less than 100 μm after brazing heating, the corrosion rate of the intermediate layer material is high, and the sacrificial anticorrosion effect is lost at an early stage. Thus, effective corrosion resistance cannot be obtained. The crystal grain size of the intermediate layer material after brazing heating is preferably 120 μm or more. The upper limit of the crystal grain size of the intermediate layer material after brazing heating is not particularly restricted, but a value of 1000 μm or more is difficult to achieve.

The inventors have further investigated and found a positive correlation between the grain size of the intermediate layer material before brazing heating and the crystal grain size of the intermediate layer material after brazing heating. That is, in order to obtain an intermediate layer material with a large crystal grain size after brazing heating, it is necessary that the crystal grain size of the intermediate layer material before brazing heating is large. As a result of further investigation into this point, it has been found that the crystal grain size of the intermediate layer material after brazing heating becomes 100 μm or more when the crystal grain size of the intermediate layer material before brazing heating is 60 μm or more. When the crystal grain size of the intermediate layer material before brazing heating is less than 60 μm, the crystal grain size of the intermediate layer material after brazing heating becomes less than 100 μm. In this regard, the crystal grain size before brazing heating is preferably 80 μm or more. The upper limit of the crystal grain size of the intermediate layer material before brazing heating is not particularly restricted, but a value of 1000 μm or more is difficult to achieve.

7. Crystal Grain Size of Core Material

Figure 2:
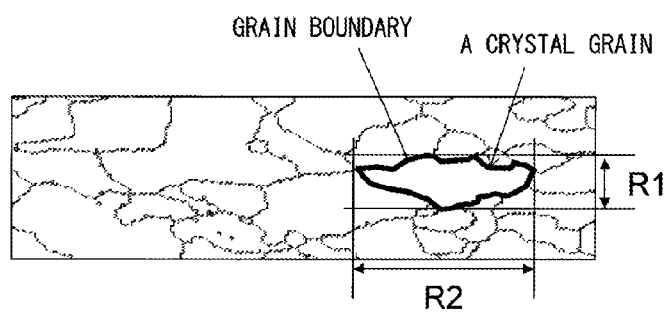
Figure 3:

With respect to the cladded aluminum-alloy material of the invention, in a cross section of the core material in a rolling direction before brazing heating, when R1 (μm) represents the crystal grain size in a plate thickness direction, and R2 (μm) represents the crystal grain size in the rolling direction, R1/R2 is restricted to 0.30 or less. The ratio is an index to improve the formability of the clad material before brazing heating. As shown in FIG. 2, the crystal grain sizes R1 and R2 (μm) here are defined as the maximum diameter of a crystal grain in the plate thickness direction and the maximum diameter in the rolling direction, respectively, where the crystal grain is an area surrounded by crystal grain boundaries when a cross section along the rolling direction of the clad material is observed. A grain boundary is a boundary with a difference between the neighboring crystal orientations of 20 degrees or more. The method for measuring the crystal grain sizes is not particularly restricted, but electron backscatter diffraction (EBSD) is generally used. In this regard, in the case where the degree of processing of the core material is very high, a fibrous structure like the structure shown in FIG. 3 is observed when the core material is subjected to anodic oxidation after mirror polishing and the surface subjected to the anodic oxidation is observed using a polarized light microscope. In such a case, the crystal grains are completely crushed flat in the thickness direction, and this case is defined as R1=0.

As already described above, so far, the formability of an aluminum alloy has been improved by adjusting the mechanical properties by the refining type determined by the conditions of process annealing or the reduction in a subsequent step. However, when a step such as bending under severe conditions is conducted, the material cracks. The inventors have conducted intensive studies and as a result found that excellent formability can be obtained when the crystal grains of the core material before brazing heating are flat in the rolling direction in a cross section along the rolling direction. In the invention, the ratio R1/R2 is used as an index of the flatness of the crystal grains. Upon investigation in detail by the inventors, it has been found that the crystal grains of the core material are flat enough and excellent formability is exhibited when the ratio R1/R2 is 0.30 or less. When the ratio R1/R2 exceeds 0.30, the flatness of the crystal grains of the core material is insufficient, and excellent formability cannot be achieved. The ratio R1/R2 is preferably 0.20 or less. The ratio R1/R2 is preferably small, because the degree of flatness becomes higher and the processability becomes better. As described above, the ratio R1/R2 may be 0 with R1=0.

8. Production Method of Cladded Aluminum-Alloy Material 8-1. Embodiments of Production Method The method for producing the cladded aluminum-alloy material of the first embodiment according to the invention includes a step of casting the aluminum alloys for the core material, the intermediate layer material and the first brazing filler metal, respectively, a hot rolling step of hot rolling the cast intermediate layer material ingot and the cast first brazing filler metal to predetermined thicknesses, respectively, a cladding step of cladding the intermediate layer material rolled to the predetermined thickness on one surface of the core material ingot, cladding the first brazing filler metal rolled to the predetermined thickness on the other surface of the core material ingot and thus obtaining a clad material, a hot clad rolling step of hot rolling the clad material, a cold rolling step of cold rolling the hot-clad-rolled clad material, and one or more annealing steps of annealing the clad material either during or after the cold rolling step or both during and after the cold rolling step.

The method for producing the cladded aluminum-alloy material of the second embodiment according to the invention includes a step of casting the aluminum alloys for the core material, the intermediate layer material, the first brazing filler metal and the second brazing filler metal, respectively, a hot rolling step of hot rolling the cast intermediate layer material ingot, the cast first brazing filler metal ingot and the cast second brazing filler metal ingot to predetermined thicknesses, respectively, a cladding step of cladding the intermediate layer material rolled to the predetermined thickness on one surface of the core material ingot, cladding the brazing first filler metal rolled to the predetermined thickness on the intermediate layer material surface which is not at the core material side and cladding the brazing second filler metal rolled to the predetermined thickness on the other surface of the core material ingot and thus obtaining a clad material, a hot clad rolling step of hot rolling the clad material, a cold rolling step of cold rolling the hot-clad-rolled clad material, and one or more annealing steps of annealing the clad material either during or after the cold rolling step or both during and after the cold rolling step.

8-2. Casting Step and Hot Rolling Step

The conditions of the step of casting the core material, the first and second brazing filler metals and the intermediate layer material are not particularly restricted, but in general, water-cooled semi-continuous casting is employed. In the step of hot rolling the core material, the intermediate layer material and the first and second brazing filler metals to the predetermined thicknesses, the heating conditions are preferably a temperature of 400 to 560° C. and a period of 1 to 10 hours. When the temperature is lower than 400° C., the plasticity is poor, and edge cracking or the like may be caused during rolling. In the case of a high temperature exceeding 560° C., the ingots may melt during heating. When the heating time is shorter than one hour, since the temperatures of the ingots become uneven, the plasticity is poor, and edge cracking or the like may be caused during rolling. When the heating time exceeds 10 hours, the productivity deteriorates notably.

8-3. Hot Clad Rolling Step

During the methods for producing the cladded aluminum-alloy materials of the first and second embodiments, in the hot clad rolling step, the rolling start temperature is 400 to 520° C., and the number of rolling passes each with a rolling reduction of 30% or more is restricted to five or less while the temperature of the clad material is 200 to 400° C. The hot clad rolling step may be divided into a rough rolling step and a finish rolling step. In the finish rolling step, a reversing or tandem rolling mill is used. In a reversing rolling mill, a pass is defined as a one-way rolling, and in a tandem rolling mill, a pass is defined as rolling with a set of rolls.

First, the rolling pass is explained. As already described above, in the cladded aluminum-alloy material of the invention, it is necessary to increase the crystal grain size of the intermediate layer material before brazing heating. The crystal grains of the intermediate layer material are formed in an annealing step during the production, and as the strain accumulated in the intermediate layer material before annealing becomes greater, the driving force for the grain growth generated during annealing becomes larger, and larger crystal grains can be obtained. On the other hand, in the cladded aluminum-alloy material of the invention, it is necessary that the crystal grains of the core material are flat before brazing heating. The crystal grains of the core material are also formed in an annealing step during the production. As the strain accumulated in the core material before annealing becomes smaller, the driving force for the grain growth in the plate thickness direction generated during annealing becomes smaller, and as a result, flat crystal grains can be obtained.

That is, to increase the size of the crystal grains of the intermediate layer material and to flatten the crystal grains of the core material are incompatible. Accordingly, it has been difficult with the conventional techniques to achieve both. However, as a result of intensive studies, the inventors have found that both can be achieved by controlling the hot clad rolling step.

When a rolling pass with a large rolling reduction is conducted while the temperature of the hot clad rolling is relatively low, larger shear strain tends to be caused also in the center of the material. More specifically, in the hot clad rolling step, when the number of rolling passes with a rolling reduction of 30% or more is restricted to five or less while the temperature of the clad material is 200 to 400° C., the shear strain caused in the core material becomes small, and the crystal grains of the core material before braze heating can be made flat. While the temperature of the clad material is higher than 400° C. in the hot clad rolling step, dynamic recovery occurs during the hot clad rolling, and the shear strain caused in the core material does not become large even by a rolling pass with a rolling reduction of 30% or more. Thus, the flatness of the crystal grains of the core material is not affected. On the other hand, when the temperature of the clad material is lower than 200° C. in the hot clad rolling step, cracking occurs during the hot rolling, and a clad material cannot be produced. Also, when the rolling reduction is less than 30% per pass, the shear strain caused in the core material does not become large, and the flatness of the crystal grains of the core material is not affected. The number of rolling passes with a rolling reduction of 30% or more is preferably four or less while the temperature of the clad material is 200 to 400° C. The rolling reduction is preferably 35% or more. When a rolling pass with a rolling reduction exceeding 50% is applied, cracking of the material or the like may occur.

On the other hand, even when the number of rolling passes with a rolling reduction of 30% or more is restricted to five or less while the temperature of the clad material is 200 to 400° C. in the hot clad rolling step, large shear strain is caused in the intermediate layer material, which is close to the surface layer of the clad material. Thus, grains grow sufficiently in the intermediate layer material during process annealing, and large crystal grains can be formed in the intermediate layer material. That is, by the control in the hot clad rolling, the crystal grains of the intermediate layer material can be coarsened and the crystal grains of the core material can be made flat.

Next, the rolling start temperature is explained. The grain size of the intermediate layer material before brazing heating is controlled by adjusting the rolling start temperature in the hot clad rolling step. When the start temperature of the hot clad rolling is 520° C. or lower, large shear strain is caused in the intermediate layer material during the hot clad rolling, and the crystal grain size of the intermediate layer material before brazing heating can be increased. When the start temperature of the hot clad rolling exceeds 520° C., dynamic recovery occurs in the intermediate layer material during the hot clad rolling, and the shear strain becomes smaller. Thus, the crystal grain size of the intermediate layer material before brazing heating cannot be increased. On the other hand, when the material temperature is lower than 400° C. at the start of the hot clad rolling, the material cracks during rolling. Thus, the start temperature of the hot clad rolling is 400 to 520° C. The start temperature of the hot clad rolling is preferably 420 to 500° C. or lower.

In the hot clad rolling step, the lower limit is not particularly set for the number of the passes with a rolling reduction of 30% or more conducted while the temperature of the clad material is 200 to 400° C. However, when no pass with a rolling reduction of 30% or more is included, many passes with a rolling reduction less than 30% are required to obtain the desired effects, and the productivity deteriorates. Accordingly, it is preferable that one or more passes with a rolling reduction of 30% or more are included. Moreover, the clad material is preferably heated at 400 to 560° C. for 1 to 10 hours before the hot clad rolling. When the heating temperature is lower than 400° C., the material temperature during rolling becomes too low, and thus the material may crack during rolling. On the other hand, when the heating temperature exceeds 560° C., the brazing filler metal may melt. When the heating time is shorter than one hour, the material temperature is unlikely to become even. On the other hand, when the heating time exceeds 10 hours, the productivity may deteriorate notably. The thickness after the hot clad rolling is not particularly restricted, but in general, a thickness of around 2.0 to 5.0 mm is preferable.

8-4. Annealing Step

In the methods for producing the cladded aluminum-alloy materials of the first and second embodiments, one or more annealing steps of annealing the clad material either during or after the cold rolling step or both during and after the cold rolling step are conducted. Specifically, (1) one or more process annealing steps are conducted during the cold rolling step; (2) one final annealing step is conducted after the cold rolling step; or (3) (1) and (2) are conducted. In the annealing steps, the clad material is held at 200 to 560° C. for 1 to 10 hours.

The annealing steps are conducted for the purpose of adjusting the strain of the material, and by the steps, the intermediate layer material can be recrystallized, and large crystal grains as those described above can be obtained. When the temperature of the clad material is lower than 200° C. in the annealing steps or when the holding time is shorter than one hour, the recrystallization of the intermediate layer material is not completed. When the annealing temperature exceeds 560° C., the brazing filler metal may melt. Even when the holding time exceeds 10 hours, there is no problem with the properties of the clad material, but the productivity deteriorates notably.

The upper limit of the number of the annealing steps is not particularly restricted, but the number is preferably three or less in order to avoid the increase of costs due to the increased number of steps.

8-5. Homogenization Step

The ingot obtained by casting the aluminum alloy core material may be subjected to a homogenization step before the cladding step. In the homogenization step, the ingot is preferably held at 450 to 620° C. for 1 to 20 hours. When the temperature is lower than 450° C. or when the holding time is shorter than one hour, the homogenization effect may be insufficient, while the core material ingot may melt when the temperature exceeds 620° C. Also, when the holding time exceeds 20 hours, the homogenization effect is saturated, and the step is an uneconomic step.

8-6. Cladding Rate

In the cladded aluminum-alloy material of the invention, the cladding rate of the intermediate layer material (one surface) is preferably 3 to 25%. As described above, during the hot clad rolling step in the production steps, it is necessary that large shear strain is caused only in the intermediate layer material. However, when the cladding rate of the intermediate layer material exceeds 25%, sufficient shear strain cannot be caused in the entire intermediate layer material, and in some cases, the intermediate layer material cannot entirely be recrystallized. On the other hand, when the cladding rate of the intermediate layer material is less than 3%, the intermediate layer material is too thin, and thus the intermediate layer material cannot always be clad on the entire surface of the core material in the hot clad rolling. The cladding rate of the intermediate layer material is more preferably 5 to 20%.

The cladding rates of the first and second brazing filler metals are not particularly restricted, but these brazing filler metals are generally clad with cladding rates of around 3 to 30%.

9. Heat Exchanger

The cladded aluminum-alloy material is preferably used as a part of a heat exchanger such as a tube material and a header plate and in particular as a tube material. For example, a tube material in which a medium such as a coolant flows is produced by bending the cladded aluminum-alloy material and brazing the overlapped edges. Also, a header plate having a hole which is joined with an end of a tube material is produced by processing the cladded aluminum-alloy material. The heat exchanger according to the invention has a structure obtained for example by combining the tube material, a fin material and the header plate and brazing the materials at once.

As described above, a heat exchanger produced by brazing using the materials of the invention under general conditions is characterized in that the crystal grain size of the intermediate layer material of the cladded aluminum-alloy material after braze heating is 100 µm or more. The characteristic can improve the corrosion resistance of the intermediate layer material after brazing heating as described above.

The heat exchanger is assembled by attaching header plates to both ends of a tube material and placing a fin material on the outer surface of the tube material. Next, the overlapped edges of the tube material, the fin material and the outer surface of the tube material, the ends of the tube material and the header plates are each joined by one braze heating at once. While a fluxless brazing method, a Nocolok brazing method and a vacuum brazing method are used as the brazing method, the fluxless brazing method in an inert gas atmosphere is preferable. Brazing is generally conducted by heating at a temperature of 590 to 610° C. for 2 to 10 minutes, preferably by heating at a temperature of 590 to 610° C. for two to six minutes. The brazed materials are generally cooled at a cooling rate of 20 to 500° C./min.

Examples

Next, the invention is explained in further detail based on Examples of the invention and Comparative Examples, but the invention is not restricted by the Examples.

Core material alloys with the alloy compositions shown In Table 1, intermediate layer material alloys with the alloy compositions shown in Table 2 and brazing filler metal alloys with the alloy compositions shown in Table 3 were each cast by DC casting and finished by facing both surfaces. The thicknesses of the ingots after facing were all 400 mm. With respect to the brazing filler metals and the intermediate layer materials, the cladding rates which would give the desired thicknesses as the final thicknesses were calculated, and the materials were subjected to a heating step at 520° C. for three hours and then hot rolled to the predetermined thicknesses which were the necessary thicknesses when the materials were combined.

TABLE 1

| Alloy | | Alloy Composition (mass %) | | | | | | | | | |
|---|---|---|---|---|---|---|---|---|---|---|---|
| | Symbol | Si | Fe | Cu | Mn | Mg | Ti | Zr | Cr | V | Al |
| Example of Invention | A1 | 0.50 | 0.20 | — | 1.1 | — | — | — | — | — | Balance |
| | A2 | 0.50 | 0.20 | — | 1.1 | 3.50 | 0.05 | — | — | — | Balance |
| | A3 | 0.50 | 0.20 | — | 1.5 | 0.05 | — | 0.05 | — | — | Balance |
| | A4 | 0.05 | 2.00 | — | 1.1 | — | — | — | 0.05 | — | Balance |
| | A5 | 1.50 | 0.05 | 0.05 | 0.5 | — | — | — | — | 0.05 | Balance |
| | A6 | 0.50 | 0.20 | — | 2.0 | — | 0.30 | 0.30 | 0.30 | 0.30 | Balance |
| | A7 | 1.20 | 0.20 | 0.05 | 1.1 | — | — | — | — | — | Balance |
| | A8 | 0.50 | 0.20 | 1.50 | 1.1 | — | — | — | — | — | Balance |
| Comparative Example | A9 | 1.60 | 0.20 | — | 1.1 | — | — | — | — | — | Balance |
| | A10 | 0.50 | 0.20 | — | 1.1 | 4.00 | — | 0.15 | — | — | Balance |
| | A11 | 0.50 | 2.20 | — | 1.5 | — | 0.15 | 0.15 | — | — | Balance |
| | A12 | 0.50 | 0.20 | — | 1.5 | — | 0.40 | 0.40 | 0.40 | 0.40 | Balance |
| | A13 | 0.50 | 0.20 | — | 2.2 | — | — | — | — | — | Balance |
| | A14 | 0.50 | 0.20 | 1.60 | 1.1 | — | — | — | — | — | Balance |
| | A15 | 0.50 | 0.20 | — | 0.4 | — | 0.05 | 0.05 | — | — | Balance |

TABLE 2

| | Alloy Symbol | Alloy Composition (mass %) | | | | | | | | | | |
|---|---|---|---|---|---|---|---|---|---|---|---|---|
| | | Zn | Si | Fe | Mn | Mg | Ni | Ti | Zr | Cr | V | Al |
| Example of Invention | B1 | 2.0 | 0.20 | 0.20 | — | 1.50 | — | — | — | — | — | Balance |
| | B2 | 2.0 | 0.20 | 0.20 | — | — | — | — | — | — | — | Balance |
| | B3 | 2.0 | 0.20 | 0.20 | — | 0.05 | — | — | — | — | — | Balance |
| | B4 | 2.0 | 0.20 | 0.20 | — | 2.50 | — | — | — | — | — | Balance |
| | B5 | 0.5 | 0.05 | 0.05 | — | 1.50 | — | 0.05 | — | — | — | Balance |
| | B6 | 8.0 | 0.20 | 0.20 | — | 1.50 | — | 0.30 | 0.30 | 0.30 | 0.30 | Balance |
| | B7 | 2.0 | 1.50 | 0.20 | — | 1.50 | — | — | 0.05 | — | — | Balance |
| | B8 | 2.0 | 0.20 | 2.00 | — | 1.50 | — | — | — | 0.05 | — | Balance |
| | B9 | 2.0 | 0.20 | 0.20 | 0.05 | 1.50 | — | — | — | — | 0.05 | Balance |
| | B10 | 2.0 | 0.20 | 0.20 | 2.00 | 1.50 | — | — | — | — | — | Balance |
| | B11 | 2.0 | 0.20 | 0.20 | — | 1.50 | 0.05 | — | — | — | — | Balance |
| | B12 | 2.0 | 0.20 | 0.20 | — | 1.50 | 2.00 | — | — | — | — | Balance |
| Comparative Example | B13 | 2.0 | 0.20 | 0.20 | — | 0.04 | — | — | — | — | — | Balance |
| | B14 | 2.0 | 0.20 | 0.20 | — | 3.00 | — | — | — | — | — | Balance |
| | B15 | 2.0 | 1.60 | 0.20 | — | 1.50 | — | — | — | — | — | Balance |
| | B16 | 2.0 | 0.20 | 2.20 | — | 1.50 | — | — | — | — | — | Balance |
| | B17 | 2.0 | 0.20 | 0.20 | — | 1.50 | — | 0.40 | 0.40 | 0.40 | 0.40 | Balance |
| | B18 | 0.4 | 0.20 | 0.20 | — | 1.50 | — | — | — | — | — | Balance |
| | B19 | 9.0 | 0.20 | 0.20 | — | 1.50 | — | — | — | — | — | Balance |
| | B20 | 2.0 | 0.20 | 0.20 | — | 1.50 | 2.20 | — | — | — | — | Balance |
| | B21 | 2.0 | 0.20 | 0.20 | 2.20 | 1.50 | — | — | — | — | — | Balance |

TABLE 3

| | Alloy Symbol | Alloy Composition (mass %) | | | | | | | | | | | | |
|---|---|---|---|---|---|---|---|---|---|---|---|---|---|---|
| | | Si | Fe | Cu | Mn | Zn | Mg | Ti | Zr | Cr | V | Na | Sr | Al |
| Example of Invention | C1 | 10.0 | 0.20 | — | — | — | — | — | — | — | — | — | — | Balance |
| | C2 | 10.0 | 0.20 | — | — | — | 1.50 | — | — | — | — | — | — | Balance |
| | C3 | 10.0 | 0.20 | — | — | — | 0.05 | — | — | — | — | — | — | Balance |
| | C4 | 10.0 | 0.20 | — | — | — | 2.50 | — | — | — | — | — | — | Balance |
| | C5 | 2.5 | 0.20 | — | — | — | — | 0.05 | — | — | — | 0.001 | — | Balance |
| | C6 | 13.0 | 0.20 | — | — | — | — | — | 0.05 | — | — | 0.001 | Balance |
| | C7 | 10.0 | 0.05 | — | — | — | — | — | — | 0.05 | — | 0.050 | — | Balance |
| | C8 | 10.0 | 1.20 | — | — | — | — | — | — | — | 0.05 | — | 0.050 | Balance |
| | C9 | 10.0 | 0.20 | 0.05 | — | — | — | 0.30 | 0.30 | 0.30 | 0.30 | — | — | Balance |
| | C10 | 10.0 | 0.20 | 1.50 | — | — | — | — | — | — | — | — | — | Balance |
| | C11 | 10.0 | 0.20 | — | 0.05 | — | — | — | — | — | — | — | — | Balance |
| | C12 | 10.0 | 0.20 | — | 2.00 | — | — | — | — | — | — | — | — | Balance |
| | C13 | 10.0 | 0.20 | — | — | 0.5 | 1.50 | — | — | — | — | — | — | Balance |
| | C14 | 10.0 | 0.20 | — | — | 8.0 | 1.50 | — | — | — | — | — | — | Balance |
| | C15 | 10.0 | 0.20 | 0.60 | — | 0.5 | 1.50 | — | — | — | — | — | — | Balance |
| Comparative Example | C16 | 10.0 | 0.20 | — | — | — | 0.04 | — | — | — | — | — | — | Balance |
| | C17 | 10.0 | 0.20 | — | — | — | 3.00 | — | — | — | — | — | — | Balance |
| | C18 | 2.0 | 0.20 | — | — | — | — | — | — | — | — | — | — | Balance |
| | C19 | 14.0 | 0.20 | — | — | — | — | — | — | — | — | — | — | Balance |
| | C20 | 10.0 | 1.40 | — | — | — | — | — | — | — | — | — | — | Balance |
| | C21 | 10.0 | 0.20 | 1.60 | — | — | — | — | — | — | — | — | — | Balance |
| | C22 | 10.0 | 0.20 | — | 2.20 | — | — | — | — | — | — | — | — | Balance |
| | C23 | 10.0 | 0.20 | — | — | — | — | 0.40 | 0.40 | 0.40 | 0.40 | — | — | Balance |
| | C24 | 10.0 | 0.20 | — | — | — | — | — | — | — | — | 0.060 | — | Balance |
| | C25 | 10.0 | 0.20 | — | — | — | — | — | — | — | — | — | 0.060 | Balance |
| | C26 | 10.0 | 0.20 | — | — | 0.4 | 1.50 | — | — | — | — | — | — | Balance |
| | C27 | 10.0 | 0.20 | — | — | 9.0 | 1.50 | — | — | — | — | — | — | Balance |

Using the alloys, an intermediate layer material in Table 2 was provided on a surface of a core material alloy, and a brazing filler metal in Table 3 was provided on the surface of the intermediate layer material which was not the core material side. In some of the examples, a brazing filler metal in Table 3 was provided also on the other surface of the core material. Here, the brazing filler metal which was clad on the surface of the intermediate layer which was not the core material side is referred to as the first brazing filler metal, and the brazing filler metal which was clad on the other surface of the core material is referred to as the second brazing filler metal. The cladding rates of the first and second brazing filler metals and the intermediate layer material were all 10%.

Such combined materials were subjected to a heating step and then to a hot clad rolling step, and three-layer and four-layer clad materials each with a thickness of 3.5 mm were produced. The temperatures and the times of the heating step and the start temperatures and the finish temperatures of the hot clad rolling step are shown in Table 4. Furthermore, in the hot clad rolling step, the clad materials were subjected to one or more rolling passes each with a rolling reduction of 30% or more while the temperatures of the clad materials were 200° C. to 400° C., and the numbers of the rolling passes are shown in Table 4. Because the start temperatures were all 400° C. or higher and the finish temperatures were all 200° C. or higher and lower than 400° C. in the Examples of the invention, it is obvious that there was a pass (passes) while the temperatures of the clad materials were 200° C. to 400° C. After the hot clad rolling step, the clad materials were subjected to cold rolling. Some of the clad materials were subjected to batch process annealing (once or twice) during the cold rolling and then to final cold rolling, and clad material samples each with a final thickness of 0.3 mm were produced. Some of the other clad materials were subjected to both of the process annealing and final annealing, and clad material samples each with a final thickness of 0.3 mm were produced. The reductions of the cold rolling after the process annealing were all 30%. The conditions of the process annealing are shown in Table 4. As shown in Table 4, neither process annealing nor final annealing was conducted in E14 to 16. The hot clad rolling was not conducted in E16. The conditions of homogenization of the core materials are shown in Table 4.

TABLE 4

|  |  | Homogenization Step of Core Material | | Hot Clad Rolling Step | | | | | Process Annealing | | | Final Annealing | |
|---|---|---|---|---|---|---|---|---|---|---|---|---|---|
|  |  | | | Heating Step | | Start | Finish | | | | | | |
|  |  | Temperature (° C.) | Time (h) | Temperature (° C.) | Time (h) | Temperature (° C.) | Temperature (° C.) | Number of Passes *1) | Time (h) | Temperature (° C.) | Number | Time (h) | Temperature (° C.) |
| Example of Invention | E1 | — | — | 480 | 5 | 460 | 230 | 3 | 5 | 350 | 1 | — | — |
|  | E2 | — | — | 400 | 5 | 400 | 200 | 2 | 5 | 350 | 1 | — | — |
|  | E3 | — | — | 550 | 5 | 520 | 250 | 4 | 1 | 350 | 1 | — | — |
|  | E4 | — | — | 480 | 1 | 430 | 210 | 3 | 10 | 350 | 1 | — | — |
|  | E5 | — | — | 480 | 10 | 460 | 220 | 3 | 5 | 200 | 1 | 5 | 200 |
|  | E6 | — | — | 480 | 5 | 460 | 230 | 3 | 5 | 560 | 1 | 5 | 200 |
|  | E7 | — | — | 480 | 5 | 460 | 230 | 5 | 5 | 350 | 2 | — | — |
|  | E8 | 450 | 1 | 480 | 5 | 460 | 230 | 3 | 5 | 350 | 1 | — | — |
|  | E9 | 620 | 10 | 480 | 5 | 460 | 230 | 3 | 5 | 350 | 1 | — | — |
| Comparative Example | E10 | — | — | 480 | 5 | 460 | 250 | 6 | 5 | 350 | 1 | — | — |
|  | E11 | — | — | 560 | 5 | 520 | 250 | 6 | 5 | 350 | 1 | — | — |
|  | E12 | — | — | 560 | 5 | 530 | 250 | 3 | 5 | 350 | 1 | — | — |
|  | E13 | — | — | 480 | 5 | 460 | 230 | 3 | 5 | 180 | 1 | — | — |
|  | E14 | — | — | 480 | 5 | 460 | 230 | 3 | 5 | 570 | 1 | — | — |
|  | E15 | — | — | 480 | 5 | 460 | 230 | 3 | 0.5 | 350 | 2 | — | — |
|  | E16 | — | — | 380 | 5 | 330 | 150 | 3 | — | — | — | — | — |
|  | E17 | — | — | 480 | 0.5 | 350 | 170 | 3 | — | — | — | — | — |
|  | E18 | — | — | 570 | 5 | — | — | — | — | — | — | — | — |

*1) the number of rolling passes each with a rolling reduction of 30% or more while the temperature of the clad material is 200 to 400° C.

The manufacturability was given a mark "○" when no problem arose during the production steps and the material could be rolled to the final thickness of 0.3 mm. The manufacturability was given a mark "x" when the material cracked during the casting or the rolling and thus the material could not be rolled to the final thickness of 0.3 mm or when a clad material could not be produced due to melting during the heating step before the hot clad rolling step or during the process annealing step or due to poor pressure bonding during the hot clad rolling. The results are shown in Tables 5 to 7. The combinations of the core material alloy, the intermediate layer material alloy and the brazing filler metal alloy and of the respective clad materials are also shown in Tables 5 to 7.

TABLE 5

|  |  | Alloy | | | | | Brazing Property | | | | |
|---|---|---|---|---|---|---|---|---|---|---|---|
|  |  |  |  | First Brazing | Second Brazing |  |  | First Brazing | Second Brazing |  | Tensile Strength after Brazing Heating |  |
|  | No. | Core Material | Intermediate Layer Material | Filler Metal | Filler Metal | Step | Manufacturability | Filler Metal | Filler Metal | Formability | (MPa) | Determination |
| Example of Invention | 1 | A1 | B1 | C1 | — | E1 | ○ | ○ | — | ○ | 142 | ○ |
|  | 2 | A2 | B3 | C1 | C13 | E1 | ○ | ○ | ○ | ○ | 230 | ○ |
|  | 3 | A3 | B4 | C1 | C14 | E1 | ○ | ○ | ○ | ○ | 148 | ○ |
|  | 4 | A4 | B5 | C5 | C15 | E1 | ○ | ○ | ○ | ○ | 142 | ○ |
|  | 5 | A5 | B6 | C6 | C2 | E1 | ○ | ○ | ○ | ○ | 160 | ○ |
|  | 6 | A6 | B7 | C7 | C3 | E1 | ○ | ○ | ○ | ○ | 149 | ○ |
|  | 7 | A7 | B8 | C8 | C4 | E1 | ○ | ○ | ○ | ○ | 159 | ○ |
|  | 8 | A8 | B9 | C9 | — | E1 | ○ | ○ | — | ○ | 188 | ○ |
|  | 9 | A1 | B10 | C10 | — | E1 | ○ | ○ | — | ○ | 140 | ○ |
|  | 10 | A1 | B11 | C11 | — | E1 | ○ | ○ | — | ○ | 145 | ○ |
|  | 11 | A1 | B12 | C12 | — | E1 | ○ | ○ | — | ○ | 142 | ○ |

TABLE 5-continued

| | | | | | | | | | | | | |
|---|---|---|---|---|---|---|---|---|---|---|---|---|
| | 12 | A1 | B1 | C13 | — | E1 | ○ | ○ | — | ○ | 143 | ○ |
| | 13 | A1 | B1 | C14 | — | E1 | ○ | ○ | — | ○ | 145 | ○ |
| | 14 | A1 | B1 | C15 | — | E1 | ○ | ○ | — | ○ | 150 | ○ |
| | 15 | A1 | B2 | C2 | — | E1 | ○ | ○ | — | ○ | 139 | ○ |
| | 16 | A1 | B2 | C3 | — | E1 | ○ | ○ | — | ○ | 134 | ○ |
| | 17 | A1 | B2 | C4 | — | E1 | ○ | ○ | — | ○ | 133 | ○ |

| | | Crystal Grain size before Brazing Heating | | | | Crystal Grain size after Brazing Heating | Corrosion Resistance | |
|---|---|---|---|---|---|---|---|---|
| | | Intermediate Layer Material (μm) | Core Material | | | Intermediate Layer Material (μm) | First Brazing Filler Metal | Second Brazing Filler Metal |
| | No. | | R1 (μm) | R2 (μm) | R1/R2 | | | |
| Example of Invention | 1 | 105 | 14 | 152 | 0.09 | 175 | ◎ | — |
| | 2 | 115 | 25 | 120 | 0.21 | 192 | ◎ | ○ |
| | 3 | 101 | 20 | 135 | 0.15 | 168 | ◎ | ○ |
| | 4 | 110 | 27 | 124 | 0.22 | 183 | ◎ | ○ |
| | 5 | 130 | 13 | 185 | 0.07 | 217 | ◎ | — |
| | 6 | 145 | 10 | 196 | 0.05 | 242 | ◎ | — |
| | 7 | 140 | 10 | 204 | 0.05 | 233 | ◎ | — |
| | 8 | 155 | 11 | 113 | 0.10 | 258 | ◎ | — |
| | 9 | 164 | 17 | 150 | 0.11 | 273 | ◎ | — |
| | 10 | 98 | 21 | 162 | 0.13 | 163 | ◎ | — |
| | 11 | 85 | 14 | 171 | 0.08 | 142 | ◎ | — |
| | 12 | 101 | 23 | 115 | 0.20 | 168 | ◎ | — |
| | 13 | 111 | 15 | 145 | 0.10 | 185 | ◎ | — |
| | 14 | 120 | 12 | 152 | 0.08 | 200 | ◎ | — |
| | 15 | 118 | 18 | 154 | 0.12 | 197 | ◎ | — |
| | 16 | 121 | 15 | 148 | 0.10 | 202 | ◎ | — |
| | 17 | 125 | 16 | 160 | 0.10 | 208 | ◎ | — |

TABLE 6

| | | Alloy | | | | | | Brazing Property | |
|---|---|---|---|---|---|---|---|---|---|
| | No. | Core Material | Intermediate Layer Material | First Brazing Filler Metal | Second Brazing Filler Metal | Step | Manufacturability | First Brazing Filler Metal | Second Brazing Filler Metal |
| Comparative Example | 18 | A9 | B1 | C1 | — | E1 | ○ | X | — |
| | 19 | A10 | B1 | C1 | — | E1 | ○ | X | — |
| | 20 | A11 | B1 | C1 | — | E1 | X | — | — |
| | 21 | A12 | B1 | C1 | — | E1 | X | — | — |
| | 22 | A13 | B1 | C1 | — | E1 | X | — | — |
| | 23 | A14 | B1 | C1 | — | E1 | X | — | — |
| | 24 | A15 | B1 | C1 | — | E1 | ○ | ○ | — |
| | 25 | A1 | B13 | C1 | — | E1 | ○ | X | — |
| | 26 | A1 | B14 | C1 | — | E1 | ○ | X | — |
| | 27 | A1 | B15 | C1 | — | E1 | ○ | X | — |
| | 28 | A1 | B16 | C1 | — | E1 | X | — | — |
| | 29 | A1 | B17 | C1 | — | E1 | X | — | — |
| | 30 | A1 | B18 | C1 | — | E1 | ○ | ○ | — |
| | 31 | A1 | B19 | C1 | — | E1 | ○ | ○ | — |
| | 32 | A1 | B20 | C1 | — | E1 | X | — | — |
| | 33 | A1 | B21 | C1 | — | E1 | X | — | — |
| | 34 | A1 | B1 | C18 | — | E1 | ○ | X | — |
| | 35 | A1 | B1 | C19 | — | E1 | ○ | X | — |
| | 36 | A1 | B1 | C20 | — | E1 | ○ | X | — |
| | 37 | A1 | B1 | C21 | — | E1 | X | — | — |
| | 38 | A1 | B1 | C22 | — | E1 | X | — | — |
| | 39 | A1 | B1 | C23 | — | E1 | X | — | — |
| | 40 | A1 | B1 | C24 | — | E1 | ○ | X | — |
| | 41 | A1 | B1 | C25 | — | E1 | ○ | X | — |
| | 42 | A1 | B1 | C1 | C26 | E1 | ○ | ○ | ○ |
| | 43 | A1 | B1 | C1 | C27 | E1 | ○ | ○ | ○ |
| | 44 | A1 | B13 | C1 | — | E1 | ○ | X | — |
| | 45 | A1 | B14 | C1 | — | E1 | ○ | X | — |
| | 46 | A1 | B2 | C16 | D16 | E1 | ○ | X | X |
| | 47 | A1 | B2 | C17 | D17 | E1 | ○ | X | X |

TABLE 6-continued

| | | | Tensile Strength after Brazing Heating | | Grain size before Brazing Heating | | | |
| | | | | | Intermediate Layer Material (μm) | Core Material | | |
| | No. | Formability | (MPa) | Determination | | R1 (μm) | R2 (μm) | R1/R2 |
|---|---|---|---|---|---|---|---|---|
| Comparative Example | 18 | ○ | 167 | ○ | 100 | 6 | 214 | 0.03 |
| | 19 | ○ | 186 | ○ | 109 | 23 | 96 | 0.24 |
| | 20 | — | — | — | — | — | — | — |
| | 21 | — | — | — | — | — | — | — |
| | 22 | — | — | — | — | — | — | — |
| | 23 | — | — | — | — | — | — | — |
| | 24 | ○ | 113 | X | 102 | 20 | 102 | 0.20 |
| | 25 | ○ | 140 | ○ | 119 | 18 | 151 | 0.12 |
| | 26 | ○ | 152 | ○ | 100 | 15 | 147 | 0.10 |
| | 27 | ○ | 146 | ○ | 183 | 16 | 161 | 0.10 |
| | 28 | — | — | — | — | — | — | — |
| | 29 | — | — | — | — | — | — | — |
| | 30 | ○ | 145 | ○ | 102 | 19 | 170 | 0.11 |
| | 31 | ○ | 144 | ○ | 96 | 17 | 166 | 0.10 |
| | 32 | — | — | — | — | — | — | — |
| | 33 | — | — | — | — | — | — | — |
| | 34 | ○ | 142 | ○ | 118 | 14 | 154 | 0.09 |
| | 35 | ○ | 144 | ○ | 103 | 17 | 169 | 0.10 |
| | 36 | ○ | 142 | ○ | 121 | 16 | 158 | 0.10 |
| | 37 | — | — | — | — | — | — | — |
| | 38 | — | — | — | — | — | — | — |
| | 39 | — | — | — | — | — | — | — |
| | 40 | ○ | 145 | ○ | 108 | 16 | 137 | 0.12 |
| | 41 | ○ | 141 | ○ | 100 | 15 | 134 | 0.11 |
| | 42 | ○ | 143 | ○ | 104 | 15 | 149 | 0.10 |
| | 43 | ○ | 140 | ○ | 109 | 15 | 154 | 0.10 |
| | 44 | ○ | 143 | ○ | 120 | 20 | 150 | 0.13 |
| | 45 | ○ | 152 | ○ | 101 | 17 | 140 | 0.12 |
| | 46 | ○ | 143 | ○ | 110 | 12 | 151 | 0.08 |
| | 47 | ○ | 145 | ○ | 118 | 16 | 161 | 0.10 |

| | | Crystal Grain size after Brazing Heating Intermediate Layer Material (μm) | Corrosion Resistance | |
| | No. | | First Brazing Filler Metal | Second Brazing Filler Metal |
|---|---|---|---|---|
| Comparative Example | 18 | 167 | — | — |
| | 19 | 182 | — | — |
| | 20 | — | — | — |
| | 21 | — | — | — |
| | 22 | — | — | — |
| | 23 | — | — | — |
| | 24 | 170 | ⊚ | — |
| | 25 | 198 | — | — |
| | 26 | 167 | — | — |
| | 27 | 305 | — | — |
| | 28 | — | — | — |
| | 29 | — | — | — |
| | 30 | 170 | X | — |
| | 31 | 160 | X | — |
| | 32 | — | — | — |
| | 33 | — | — | — |
| | 34 | 197 | — | — |
| | 35 | 172 | — | — |
| | 36 | 202 | — | — |
| | 37 | — | — | — |
| | 38 | — | — | — |
| | 39 | — | — | — |
| | 40 | 180 | ⊚ | — |
| | 41 | 167 | ⊚ | — |
| | 42 | 173 | ⊚ | X |
| | 43 | 182 | ⊚ | X |
| | 44 | 200 | — | — |
| | 45 | 168 | — | — |
| | 46 | 183 | — | — |
| | 47 | 197 | — | — |

TABLE 7

| | No. | Core Material | Intermediate Layer Material | First Brazing Filler Metal | Second Brazing Filler Metal | Step | Manufacturability | First Brazing Filler Metal | Second Brazing Filler Metal | Formability | Tensile Strength after Brazing Heating (MPa) | Determination |
|---|---|---|---|---|---|---|---|---|---|---|---|---|
| Example of Invention | 48 | A1 | B1 | C1 | — | E2 | ○ | ○ | — | ○ | 148 | ○ |
| | 49 | A1 | B1 | C1 | — | E3 | ○ | ○ | — | ○ | 139 | ○ |
| | 50 | A1 | B1 | C1 | — | E4 | ○ | ○ | — | ○ | 140 | ○ |
| | 51 | A1 | B1 | C1 | — | E5 | ○ | ○ | — | ○ | 143 | ○ |
| | 52 | A1 | B1 | C1 | — | E6 | ○ | ○ | — | ○ | 144 | ○ |
| | 53 | A1 | B1 | C1 | — | E7 | ○ | ○ | — | ○ | 141 | ○ |
| | 54 | A1 | B1 | C1 | — | E8 | ○ | ○ | — | ○ | 139 | ○ |
| | 55 | A1 | B1 | C1 | — | E9 | ○ | ○ | — | ○ | 136 | ○ |
| Comparative Example | 56 | A1 | B1 | C1 | — | E10 | ○ | ○ | — | X | 142 | ○ |
| | 57 | A1 | B1 | C1 | — | E11 | ○ | ○ | — | X | 139 | ○ |
| | 58 | A1 | B1 | C1 | — | E12 | ○ | ○ | — | ○ | 136 | ○ |
| | 59 | A1 | B1 | C1 | — | E13 | ○ | ○ | — | ○ | 142 | ○ |
| | 60 | A1 | B1 | C1 | — | E14 | X | — | — | — | — | — |
| | 61 | A1 | B1 | C1 | — | E15 | ○ | ○ | — | ○ | 140 | ○ |
| | 62 | A1 | B1 | C1 | — | E16 | X | — | — | — | — | — |
| | 63 | A1 | B1 | C1 | — | E17 | X | — | — | — | — | — |
| | 64 | A1 | B1 | C1 | — | E18 | X | — | — | — | — | — |

| | No. | Crystal Grain size before Brazing Heating Intermediate Layer Material (μm) | Crystal Grain size before Brazing Heating Core Material R1 (μm) | Crystal Grain size before Brazing Heating Core Material R2 (μm) | R1/R2 | Crystal Grain size after Brazing Heating Intermediate Layer Material (μm) | Corrosion Resistance First Brazing Filler Metal | Corrosion Resistance Second Brazing Filler Metal |
|---|---|---|---|---|---|---|---|---|
| Example of Invention | 48 | 132 | 7 | 181 | 0.04 | 220 | ◎ | — |
| | 49 | 62 | 20 | 131 | 0.15 | 103 | ◎ | — |
| | 50 | 112 | 13 | 157 | 0.08 | 187 | ◎ | — |
| | 51 | 97 | 23 | 142 | 0.16 | 162 | ◎ | — |
| | 52 | 132 | 18 | 150 | 0.12 | 220 | ◎ | — |
| | 53 | 110 | 43 | 155 | 0.28 | 183 | ◎ | — |
| | 54 | 110 | 17 | 152 | 0.11 | 183 | ◎ | — |
| | 55 | 103 | 20 | 152 | 0.13 | 172 | ◎ | — |
| Comparative Example | 56 | 130 | 38 | 96 | 0.40 | 217 | ◎ | — |
| | 57 | 131 | 35 | 99 | 0.35 | 218 | ◎ | — |
| | 58 | 56 | 23 | 151 | 0.15 | 93 | X | — |
| | 59 | Fibrous | 15 | 152 | 0.10 | 82 | X | — |
| | 60 | — | — | — | — | — | — | — |
| | 61 | Fibrous | 18 | 167 | 0.11 | 75 | X | — |
| | 62 | — | — | — | — | — | — | — |
| | 63 | — | — | — | — | — | — | — |
| | 64 | — | — | — | — | — | — | — |

The following items of the clad material samples were evaluated, and the results are also shown in Tables 5 to 7. In this regard, in the examples with the manufacturability marked with "x" in Tables 6 and 7, samples could not be produced, and thus the following evaluation could not be conducted.

(Evaluation of Formability)

JIS5 test pieces were cut out of the respective clad material samples, stretched by 5% in the direction parallel to the rolling direction and bent at 180° with a bending radius R of 0.05 mm with the intermediate layer material surface inside. A resin was applied to the bent R cross sections so that the cross sections could be observed, and the cross sections were subjected to mirror polishing. Then, the test pieces were evaluated as to whether there was a crack using an optical microscope. As a result, the formability was determined to be at an acceptable level (○) when there was no crack in the core material and at an unacceptable level (x) when there was a crack in the core material. The occurrence of cracks in the intermediate layer materials, the brazing filler metals and the intermediate layer materials was not evaluated.

(Evaluation of Brazing Property)

A fin material with a thickness of 0.07 mm, refining type of H14 and an alloy composition of 3003 alloy containing 1.0% Zn was prepared and corrugated, and thus a heat exchanger fin material was prepared. The fin material was placed on the first brazing filler metal side or the second brazing filler metal side of a clad material sample, and without coating with flux, the sample was subjected to braze heating at 600° C. for three minutes in a furnace with a nitrogen gas flow as an inert gas, thereby producing a miniature core sample. After the brazing, the fin was removed, and the fin joint ratio was determined from the ratio of the number of the contacts between the fin and the brazing filler metal (the number of the ridges) and the parts where the fillets were formed. The brazing property was determined to be at an acceptable level (○) when the fin joint ratio of the miniature core sample was 95% or more and the clad material sample and the fin did not melt. On the other hand, the brazing property was determined to be at an unacceptable level (x) when the following cases (1) and (2)

applied or the case (1) or (2) applied: (1) the fin joint ratio was less than 95%; and (2) at least one of the clad material sample and the fin melted.

(Measurement of Tensile Strength after Brazing Heating)

The clad material samples were subjected to heat treatment at 600° C. for three minutes (corresponding to braze heating) and then to a tensile test under the conditions of a speed of tensile testing of 10 mm/min and a gauge length of 50 mm according to JIS Z2241. The tensile strengths were read from the obtained stress-strain curves. As a result, the tensile strength was determined to be at an acceptable level (◯) when the value was 120 MPa or more and at an unacceptable level (x) when the value was less than 120 MPa.

(Measurement of Crystal Grain Size of Intermediate Layer Material)

The surfaces of clad material samples before brazing heating (at 600° C. for three minutes treatment corresponding to brazing heating) and clad material samples after brazing heating were polished and a brazing filler metal was removed therefrom. Subsequently, L-LT surface of the intermediate layer material is subjected to mirror polishing, and samples for the measurement of the intermediate layer material crystal grain size were thus prepared. An area of 2 mm×2 mm of each sample was analyzed by EBSD of a SEM (scanning electron microscope). Boundaries with a difference between crystal orientations of 20 degrees or more were detected as the grain boundaries from the results, and the crystal grain sizes (equivalent circle diameters) were calculated. Ten random points were selected for the measurement, and the arithmetic mean was regarded as the crystal grain size. When the recrystallization of the intermediate layer material had not been completed, the intermediate layer material had a fibrous structure, and the crystal grain size could not be measured. Such samples are indicated by "fibrous".

(Measurement of Grain Size of Core Material)

Clad material samples before brazing heating (at 600° C. for three minutes treatment corresponding to brazing heating) and clad material samples after brazing heating were used. A resin was applied to the clad material samples and mirror polishing was conducted in such a manner that the cross sections along the rolling directions became the surfaces to be measured. Thus, samples for the measurement of the core material crystal grains were prepared. An area with a length of 2 mm and a thickness of 0.2 mm of each sample was analyzed by EBSD of a SEM, and from the results, boundaries with a difference between crystal orientations of 20 degrees or more were detected as the grain boundaries to detect the crystal grains. The maximum diameter R1 of a crystal grain in the thickness direction and the maximum diameter R2 in the rolling direction were measured, and the value R1/R2 was calculated. Ten random crystal grains in a single field were measured, and the arithmetic mean was regarded as the ratio R1/R2. When no crystal grain boundary was detected by EBSD, the mirror-polished samples were subjected to anodic oxidation and observed using a polarized light microscope. The R1 was regarded as zero when a fibrous structure like the structure shown in FIG. 3 was observed.

(Corrosion Resistance)

The same miniature core samples as those used for evaluating the brazing property were used. The surfaces which were not joined with the fins were masked with an insulating resin, and the surfaces which were joined with the fins were subjected to a CASS test as a test surface based on JIS-H8502 for 500 hours and 1000 hours. As a result, the CASS corrosion resistance was determined to be excellent and at an acceptable level (◎) when corrosion perforation did not develop in the clad material within the 1000 hours, at an acceptable level (◯) when corrosion perforation did not develop in the clad material within the 500 hours and at an unacceptable level (x) when corrosion perforation developed within the 500 hours. In this regard, all the first brazing filler metals were evaluated, and the second brazing filler metals were evaluated only when the second brazing filler metals contained Zn. Regarding the samples which were not clad with any second brazing filler metal, the surfaces of the core materials which were not the surfaces clad with the first brazing filler metals (the surfaces with the exposed core materials) were not evaluated. Appropriate miniature core samples could not be produced when the brazing property was "x", and thus the samples were excluded from the evaluation.

Examples 1 to 17 and 48 to 55 of the invention satisfied the conditions defined in the invention, and the manufacturability, the formability, the brazing properties, the tensile strengths after brazing and the corrosion resistance were all at acceptable levels.

On the contrary, in Comparative Example 18, since the Si content of the core material was too much, the brazing property of the first brazing filler metal was unacceptable.

In Comparative Example 19, since the Mg content of the core material was too much, the brazing property of the first brazing filler metal was unacceptable.

In Comparative Example 20, since the Fe content of the core material was too much, a crack was caused during the rolling, and a brazing sheet could not be produced. Thus, the manufacturability was unacceptable.

In Comparative Example 21, since the Ti, Zr, Cr and V contents of the core material were too much, a crack was caused during the rolling, and a brazing sheet could not be produced. Thus, the manufacturability was unacceptable.

In Comparative Example 22, since the Mn content of the core material was too much, a crack was caused during the rolling, and a brazing sheet could not be produced. Thus, the manufacturability was unacceptable.

In Comparative Example 23, since the Cu content of the core material was too much, a crack was caused during the casting, and a brazing sheet could not be produced. Thus, the manufacturability was unacceptable.

In Comparative Example 24, since the Mn content of the core material was too little, the tensile strength after the brazing heating was unacceptable.

In Comparative Example 25, since the Mg content of the intermediate layer material was too little, the brazing property of the first brazing filler metal was unacceptable.

In Comparative Example 26, since the Mg content of the intermediate layer material was too much, the brazing property of the first brazing filler metal was unacceptable.

In Comparative Example 27, since the Si content of the intermediate layer material was too much, the brazing property of the first brazing filler metal was unacceptable.

In Comparative Example 28, since the Fe content of the intermediate layer material was too much, a crack was caused during the rolling, and a brazing sheet could not be produced. Thus, the manufacturability was unacceptable.

In Comparative Example 29, since the Ti, Zr, Cr and V contents of the intermediate layer material were too much, a crack was caused during the rolling, and a brazing sheet could not be produced. Thus, the manufacturability was unacceptable.

In Comparative Example 30, since the Zn content of the intermediate layer material was too little, the corrosion resistance of the first brazing filler metal at the intermediate layer material side was unacceptable.

In Comparative Example 31, since the Zn content of the intermediate layer material was too much, the corrosion resistance of the first brazing filler metal at the intermediate layer material side was unacceptable.

In Comparative Example 32, since the Ni content of the intermediate layer material was too much, a crack was caused during the rolling, and a brazing sheet could not be produced. Thus, the manufacturability was unacceptable.

In Comparative Example 33, since the Mn content of the intermediate layer material was too much, a crack was caused during the rolling, and a brazing sheet could not be produced. Thus, the manufacturability was unacceptable.

In Comparative Example 34, since the Si content of the first brazing filler metal was too little, the brazing property of the first brazing filler metal was unacceptable.

In Comparative Example 35, since the Si content of the first brazing filler metal was too much, the brazing property of the first brazing filler metal was unacceptable.

In Comparative Example 36, since the Fe content of the first brazing filler metal was too much, the brazing property of the first brazing filler metal was unacceptable.

In Comparative Example 37, since the Cu content of the first brazing filler metal was too much, a crack was caused during the rolling, and a brazing sheet could not be produced. Thus, the manufacturability was unacceptable.

In Comparative Example 38, since the Mn content of the first brazing filler metal was too much, a crack was caused during the rolling, and a brazing sheet could not be produced. Thus, the manufacturability was unacceptable.

In Comparative Example 39, since the Ti, Zr, Cr and V contents of the first brazing filler metal was too much, a crack was caused during the rolling, and a brazing sheet could not be produced. Thus, the manufacturability was unacceptable.

In Comparative Example 40, since the Na content of the first brazing filler metal was too much, the brazing property of the first brazing filler metal was unacceptable.

In Comparative Example 41, since the Sr content of the first brazing filler metal was too much, the brazing property of the first brazing filler metal was unacceptable.

In Comparative Example 42, since the Zn content of the second brazing filler metal was too little, the corrosion resistance of the second brazing filler metal was unacceptable.

In Comparative Example 43, since the Zn content of the second brazing filler metal was too much, the corrosion resistance of the second brazing filler metal was unacceptable.

In Comparative Example 44, since the first brazing filler metal did not contain Mg and the Mg content of the intermediate layer material was too little, the brazing property of the first brazing filler metal was unacceptable.

In Comparative Example 45, since the first brazing filler metal did not contain Mg and the Mg content of the intermediate layer material was too much, the brazing property of the first brazing filler metal was unacceptable.

In Comparative Example 46, since the intermediate layer material did not contain Mg and the Mg content of the first brazing filler metal was too little, the brazing property of the first brazing filler metal was unacceptable. Furthermore, since the Mg content of the second brazing filler metal was too little, the brazing property of the second brazing filler metal was unacceptable.

In Comparative Example 47, since the Mg contents of the first and second brazing filler metals were too much, the brazing properties of the first and second brazing filler metals were unacceptable.

In Comparative Examples 56 and 57, the numbers of passes each with a rolling reduction of 30% or more were more than five while the temperatures of the clad materials were 200° C. to 400° C. during the clad hot rolling. Thus, the ratios R1/R2 of the core material crystal grains were more than 0.30 before the brazing, and the formability was unacceptable.

In Comparative Example 58, the temperature at the start of the clad hot rolling was higher than 520° C. Thus, the crystal grain size of the intermediate layer material was less than 60 μm before the brazing, and the crystal grain size of the intermediate layer material was less than 100 μm after the brazing. Therefore, the corrosion resistance of the first brazing filler metal was unacceptable.

In Comparative Example 59, the temperature of the process annealing was lower than 200° C. Thus, the intermediate layer material had a fibrous structure before the brazing, and the crystal grain size of the intermediate layer material was less than 100 μm after the brazing. Therefore, the corrosion resistance of the first brazing filler metal was unacceptable.

In Comparative Example 60, since the temperature of the process annealing was higher than 560° C., the first brazing filler metal melted, and a brazing sheet could not be produced. Thus, the manufacturability was unacceptable.

In Comparative Example 61, the process annealing time was shorter than one hour. Thus, the intermediate layer material had a fibrous structure before the brazing, and the crystal grain size of the intermediate layer material was less than 100 μm after the brazing. Therefore, the corrosion resistance of the first brazing filler metal was unacceptable.

In Comparative Example 62, the heating temperature for the intermediate layer material and the first brazing filler metal was too low, and the start temperature of the hot clad rolling was lower than 400° C. (annealing process was not included). Thus, a crack was caused during the hot clad rolling, and a brazing sheet with the desired thickness could not be produced.

In Comparative Example 63, the heating time for the intermediate layer material and the first brazing filler metal was too short, and the start temperature of the hot clad rolling was lower than 400° C. (annealing process was not included). Thus, a crack was caused during the hot clad rolling, and a brazing sheet with the desired thickness could not be produced.

In Comparative Example 64, since the heating temperature for the intermediate layer material and the first brazing filler metal was too high, the brazing filler metal melted, and a brazing sheet with the desired thickness could not be produced.

INDUSTRIAL APPLICABILITY

The cladded aluminum-alloy material according to the invention has high strength after brazing and is excellent in the brazing properties such as the fin joint ratio and the erosion resistance and the corrosion resistance. Thus, the cladded aluminum-alloy material is preferably used as a part forming a flow path of an automobile heat exchanger in particular.

The invention claimed is:
1. A cladded aluminum-alloy material having an aluminum alloy core material, an intermediate layer material clad on one surface of the core material and a brazing filler metal clad on the intermediate layer material surface which is not at the core material side,
  wherein the core material comprises an aluminum alloy comprising 0.05 to 1.50 mass % Si, 0.05 to 2.00 mass % Fe, 0.5 to 2.0 mass % Mn and a balance of Al and unavoidable impurities, either one or both of the intermediate layer material and the brazing filler metal comprises 0.05 to 2.50 mass % Mg, the intermediate layer material comprises an aluminum alloy further comprising 0.5 to 8.0 mass % Zn, 0.05 to 1.50 mass % Si, 0.05 to 2.00 mass % Fe and a balance of Al and unavoidable impurities, and the brazing filler metal comprises an aluminum alloy further comprising 2.5 to 13.0 mass % Si, 0.05 to 1.20 mass % Fe and a balance of Al and unavoidable impurities,
  a crystal grain size of the intermediate layer material before brazing heating is 60 μm or more, and in a cross section of the core material in a rolling direction before brazing heating, when R1 (μm) represents the crystal grain size in a plate thickness direction, and R2 (μm) represents the crystal grain size in the rolling direction, R1/R2 is 0.30 or less.

2. The cladded aluminum-alloy material according to claim 1, wherein the core material comprises the aluminum alloy further comprising one or, two or more selected from 0.05 to 3.50 mass % Mg, 0.05 to 1.50 mass % Cu, 0.05 to 0.30 mass % Ti, 0.05 to 0.30 mass % Zr, 0.05 to 0.30 mass % Cr and 0.05 to 0.30 mass % V.

3. The cladded aluminum-alloy material according to claim 1, wherein the intermediate layer material comprises the aluminum alloy further comprising one or, two or more selected from 0.05 to 2.00 mass % Ni, 0.05 to 2.00 mass % Mn, 0.05 to 0.30 mass % Ti, 0.05 to 0.30 mass % Zr, 0.05 to 0.30 mass % Cr and 0.05 to 0.30 mass % V.

4. The cladded aluminum-alloy material according to claim 1, wherein the brazing filler metal comprises the aluminum alloy further comprising one or, two or more selected from 0.5 to 8.0 mass % Zn, 0.05 to 1.50 mass % Cu, 0.05 to 2.00 mass % Mn, 0.05 to 0.30 mass % Ti, 0.05 to 0.30 mass % Zr, 0.05 to 0.30 mass % Cr and 0.05 to 0.30 mass % V.

5. The cladded aluminum-alloy material according to claim 1, wherein the brazing filler metal comprises the aluminum alloy further comprising one or two selected from 0.001 to 0.050 mass % Na and 0.001 to 0.050 mass % Sr.

6. A method for producing the cladded aluminum-alloy material according to claim 1, comprising:
  a step of casting the aluminum alloys for the core material, the intermediate layer material and the brazing filler metal, respectively,
  a hot rolling step of hot rolling the cast intermediate layer material ingot and the cast brazing filler metal ingot to predetermined thicknesses, respectively,
  a cladding step of cladding the intermediate layer material rolled to the predetermined thickness on one surface of the core material ingot, and cladding the brazing filler metal rolled to the predetermined thickness on the intermediate layer material surface which is not at the core material side and thus obtaining a clad material,
  a hot clad rolling step of hot rolling the clad material, a cold rolling step of cold rolling the hot-clad-rolled clad material, and
  one or more annealing steps of annealing the clad material either during or after the cold rolling step or both during and after the cold rolling step,
  wherein in the hot clad rolling step, the rolling start temperature is 400 to 520° C., and the number of rolling passes each with a rolling reduction of 30% or more is restricted to five or less while the temperature of the clad material is 200 to 400° C., and the clad material is held at 200 to 560° C. for 1 to 10 hours in the annealing steps.

7. A cladded aluminum-alloy material having an aluminum alloy core material, an intermediate layer material clad on one surface of the core material, a brazing filler metal clad on the intermediate layer material surface which is not at the core material side, and a brazing filler metal clad on the other surface of the core material,
  wherein the core material comprises an aluminum alloy comprising 0.05 to 1.50 mass % Si, 0.05 to 2.00 mass % Fe, 0.5 to 2.0 mass % Mn and a balance of Al and unavoidable impurities, either one or both of the intermediate layer material and the brazing filler metal clad on the intermediate layer material surface which is not at the core material side comprises 0.05 to 2.50 mass % Mg, the intermediate layer material comprises an aluminum alloy further comprising 0.5 to 8.0 mass % Zn, 0.05 to 1.50 mass % Si, 0.05 to 2.00 mass % Fe and a balance of Al and unavoidable impurities, the brazing filler metal clad on the intermediate layer material surface which is not at the core material side comprises an aluminum alloy further comprising 2.5 to 13.0 mass % Si, 0.05 to 1.20 mass % Fe and a balance of Al and unavoidable impurities, the brazing filler metal clad on the other surface of the core material comprises an aluminum alloy comprising 2.5 to 13.0 mass % Si, 0.05 to 1.20 mass % Fe, 0.05 to 2.50 mass % Mg and a balance of Al and unavoidable impurities,
  a crystal grain size of the intermediate layer material before brazing heating is 60 μm or more, and in a cross section of the core material in a rolling direction before brazing heating, when R1 (μm) represents the crystal grain size in a plate thickness direction, and R2 (μm) represents the crystal grain size in the rolling direction, R1/R2 is 0.30 or less.

8. The cladded aluminum-alloy material according to claim 7, wherein the core material comprises the aluminum alloy further comprising one or, two or more selected from 0.05 to 3.50 mass % Mg, 0.05 to 1.50 mass % Cu, 0.05 to 0.30 mass % Ti, 0.05 to 0.30 mass % Zr, 0.05 to 0.30 mass % Cr and 0.05 to 0.30 mass % V.

9. The cladded aluminum-alloy material according to claim 7, wherein the intermediate layer material comprises the aluminum alloy further comprising one or, two or more selected from 0.05 to 2.00 mass % Ni, 0.05 to 2.00 mass % Mn, 0.05 to 0.30 mass % Ti, 0.05 to 0.30 mass % Zr, 0.05 to 0.30 mass % Cr and 0.05 to 0.30 mass % V.

10. The cladded aluminum-alloy material according to claim 7, wherein the brazing filler metal clad on the intermediate layer material surface which is not at the core material side comprises the aluminum alloy further comprising one or, two or more selected from 0.5 to 8.0 mass % Zn, 0.05 to 1.50 mass % Cu, 0.05 to 2.00 mass % Mn, 0.05 to 0.30 mass % Ti, 0.05 to 0.30 mass % Zr, 0.05 to 0.30 mass % Cr and 0.05 to 0.30 mass % V.

11. The cladded aluminum-alloy material according to claim 7, wherein the brazing filler metal clad on the intermediate layer material surface which is not at the core material side comprises the aluminum alloy further comprising one or two selected from 0.001 to 0.050 mass % Na and 0.001 to 0.050 mass % Sr.

12. The cladded aluminum-alloy material according to claim 7, wherein the brazing filler metal clad on the other surface of the core material comprises the aluminum alloy further comprising one or, two or more selected from 0.5 to 8.0 mass % Zn, 0.05 to 1.50 mass % Cu, 0.05 to 2.00 mass % Mn, 0.05 to 0.30 mass % Ti, 0.05 to 0.30 mass % Zr, 0.05 to 0.30 mass % Cr and 0.05 to 0.30 mass % V.

13. The cladded aluminum-alloy material according to claim 7, wherein the brazing filler metal clad on the other surface of the core material comprises the aluminum alloy further comprising one or two selected from 0.001 to 0.050 mass % Na and 0.001 to 0.050 mass % Sr.

14. A method for producing the cladded aluminum-alloy material according to claim 7, comprising:

- a step of casting the aluminum alloys for the core material, the intermediate layer material, the brazing filler metal clad on the intermediate layer material surface which is not at the core material side and the brazing filler metal clad on the other surface of the core material, respectively,
- a hot rolling step of hot rolling the cast intermediate layer material ingot, the cast brazing filler metal ingot clad on the intermediate layer material surface which is not at the core material side and the cast brazing filler metal ingot clad on the other surface of the core material to predetermined thicknesses, respectively,
- a cladding step of cladding the intermediate layer material rolled to the predetermined thickness on one surface of the core material ingot, cladding the brazing filler metal rolled to the predetermined thickness on the intermediate layer material surface which is not at the core material side, and cladding the brazing filler metal rolled to the predetermined thickness on the other surface of the core material ingot and thus obtaining a clad material,
- a hot clad rolling step of hot rolling the clad material,
- a cold rolling step of cold rolling the hot-clad-rolled clad material, and
- one or more annealing steps of annealing the clad material either during or after the cold rolling step or both during and after the cold rolling step,
- wherein in the hot clad rolling step, the rolling start temperature is 400 to 520° C., and the number of rolling passes each with a rolling reduction of 30% or more is restricted to five or less while the temperature of the clad material is 200 to 400° C., and the clad material is held at 200 to 560° C. for 1 to 10 hours in the annealing steps.

15. A heat exchanger using the cladded aluminum-alloy material according to claim 1, wherein the crystal grain size of the intermediate layer material after brazing heating is 100 μm or more.

16. A method for producing the heat exchanger according to claim 15, wherein an aluminum alloy material is brazed in an inert gas atmosphere without flux.

17. A heat exchanger using the cladded aluminum-alloy material according to claim 7, wherein the crystal grain size of the intermediate layer material after brazing heating is 100 μm or more.

18. A method for producing the heat exchanger according to claim 17, wherein an aluminum alloy material is brazed in an inert gas atmosphere without flux.

* * * * *